(12) United States Patent
Bumbulis

(10) Patent No.: US 6,694,323 B2
(45) Date of Patent: Feb. 17, 2004

(54) SYSTEM AND METHODOLOGY FOR PROVIDING COMPACT B-TREE

(75) Inventor: Peter Bumbulis, Cambridge (CA)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 10/352,465

(22) Filed: Jan. 27, 2003

(65) Prior Publication Data

US 2003/0204513 A1 Oct. 30, 2003

Related U.S. Application Data

(60) Provisional application No. 60/375,620, filed on Apr. 25, 2002.

(51) Int. Cl.[7] .............................................. G06F 17/30
(52) U.S. Cl. ...................................... 707/101; 707/102
(58) Field of Search ............................ 707/1, 2, 3, 4, 707/5, 6, 7, 8, 9, 10, 101, 102, 103

(56) References Cited

U.S. PATENT DOCUMENTS 5,495,608 A * 2/1996 Antoshenkov ................. 707/3
6,041,053 A * 3/2000 Douceur et al. ............. 370/339
6,535,869 B1 * 3/2003 Housel, III .................... 707/2
6,560,610 B1 * 5/2003 Eatherton et al. ........ 707/104.1

OTHER PUBLICATIONS

"An experimental study of compression methods for dynamic tries ", Stefan Nilsson, Oct., 1998.*

* cited by examiner

Primary Examiner—Diane D. Mizrahi
Assistant Examiner—Yicun Wu
(74) Attorney, Agent, or Firm—John A. Smart; G. Mack Riddle

(57) ABSTRACT

An improved method for creating an index based on a path-compressed binary trie in a database system comprising database tables and indexes on those tables is described. For a given index to be created, a path-compressed binary trie for the given index is determined. The path-compressed binary trie comprises internal nodes and leaf nodes. Based on a traversal of the path-compressed binary trie, an index is created comprising a first array of internal nodes encountered during the traversal, and a second array of leaf nodes encountered during the traversal. The database system employs said first and second arrays for providing index-based access for a given key value.

59 Claims, 15 Drawing Sheets

B-TREE 510

PATRICIA TREE 520

NODES OF PATRICIA
TREE LABELED WITH BIT
OFFSET

| BLIND SEARCH FOR '01001' IN ARRAY REPRESENTATION 725 | | | | | | | |
|---|---|---|---|---|---|---|---|
| LEAF ARRAY 726 | | | | INTERNAL ARRAY 727 | | | |
| B | E | F | g | a | c | d | n |
| 00111 | 01000 | 01001 | 01010 | (1, 2) | (2, 4) | (1, 5) | |
| i = 1 | | | | j = 1 | | | n = 4 |
| (1) 01001 -- go right | | | | | | | |
| | i = 2 | | | | j = 2 | | n = 3 |
| (2) 01001 -- go left | | | | | | | |
| | | | | | | j = 3 | n = 2 |
| | i = 2 | | | | | | |
| (3) 01001 -- go right | | | | | | | |
| | | i = 3 | | | | | n = 1 |

*FIG. 7C*

POST-SPLIT

SYSTEM AND METHODOLOGY FOR PROVIDING COMPACT B-TREE

RELATED APPLICATIONS

The present application is related to and claims the benefit of priority of the following commonly-owned provisional application(s): application Serial No. 60/375,620 (Docket No. SYB/0087.00), filed Apr. 25, 2002, entitled "System and Methodology for Providing Compact B-Tree", of which the present application is a non-provisional application thereof. The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to information processing environments and, more particularly, to a database management system (DBMS) having a methodology for providing compact B-Tree indexes.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from, or updated in, such files, and so forth, all without user knowledge of underlying system implementation. In this manner, the DBMS provides users with a conceptual view of the database that is removed from the hardware level. The general construction and operation of a database management system is known in the art. See e.g., Date, C., "An Introduction to Database Systems, Volume I and II," Addison Wesley, 1990; the disclosure of which is hereby incorporated by reference.

DBMS systems have long since moved from a centralized mainframe environment to a decentralized or distributed environment. One or more PC "client" systems, for instance, may be connected via a network to one or more server-based database systems (SQL database server). Commercial examples of these "client/server" systems include Powersoft® clients connected to one or more Sybase® SQL Anywhere® Studio (Adaptive Server® Anywhere) database servers. Both Powersoft® and Sybase® SQL Anywhere® Studio (Adaptive Server® Anywhere) are available from Sybase, Inc. of Dublin, Calif.

In today's computing environment, database technology can be found on virtually any device, from traditional mainframe computers to cellular phones. Sophisticated applications, whether human resources information systems or sales force automation systems, can "push" much of their complexity into the database itself. Indeed, this represents one of the main benefits of database technology. The challenge, however, is to support these applications, and the complex queries they generate, on small computing devices. At the same time, users expect the productivity and reliability advantages of using a relational DBMS.

Consider, for instance, the execution of a request for information from a relational DBMS. In operation, this request is typically issued by a client system as one or more Structured Query Language or "SQL" queries for retrieving particular data (i.e., data records meeting the query condition) from database tables on a server. For example, the following simple SQL SELECT statement results in a list of the names of those employees earning $10,000, where "employees" is a table defined to include information about employees of a particular organization:

SELECT name

FROM employees

WHERE sal=10,000

The syntax of SQL is well documented, see e.g., the above-mentioned "An Introduction to Database Systems." For further information on SQL, see e.g., "Information Technology—Database languages—SQL," published by the American National Standards Institute as American National Standard ANSI/ISO/IEC 9075: 1992, the disclosure of which is hereby incorporated by reference.

For enhancing the speed in which the DBMS stores, retrieves, and presents particular data records, the DBMS usually maintains one or more database indexes on a database table. A database index, typically maintained as a B-Tree (or B+-Tree) data structure, allows the records of a table to be organized in many different ways, depending on a particular user's needs. An index may be constructed as a single disk file storing index key values together with unique record numbers. The index key values are a data quantity composed of one or more fields from a record which are used to arrange (logically) the database file records in some desired order (index expression). The record numbers are unique pointers or identifiers to the actual storage location of each record in the database file. Both are referred to internally by the system for locating and displaying records in a database file.

Searching for a particular record in a B-Tree index occurs by traversing a particular path in the tree. To find a record with a particular key value, one would maneuver through the tree comparing key values stored at each node visited with the key value sought. The results of each comparison operation, in conjunction with the pointers stored with each node, indicate which path to take through the tree to reach the record ultimately desired. Ultimately, a search will end at a particular leaf node which will, in turn, point to (i.e., store a pointer to or identifier for) a particular data record for the key value sought. Alternatively, the leaf nodes may for "clustered indexes" store the actual data of the data records on the leaf nodes themselves.

An index allows a database server to find and retrieve specific rows much faster than it could without using the index. A sequential or linear scan from the beginning of a database table, comparing each record along the way, is exceedingly slow compared to using an index. There, all of the blocks of records would have to be visited until the record sought is finally located. For a table of even moderate size, such an approach yields unacceptable performance. As a result, virtually all modern-day relational database systems employ B-Tree indexes or a variant.

General techniques for the construction and operation of B-Trees are well documented in the technical, trade, and patent literature. For a general description, see Sedgewick, R., "Algorithms in C," Addison-Wesley, 1990. For a survey of various B-Tree implementations, see Comer, D., "The Ubiquitous B-Tree," Computing Surveys, Vol. 11, No. 2, June 1979, pp. 121–137. For further description of B-Tree indexes, see e.g., commonly-owned U.S. Pat. No. 6,363,376 titled "Database system providing methodology for enhancing concurrency using row update bit and deferred locking." The disclosures of each of the foregoing references are hereby incorporated by reference.

Many B-Tree variants have been introduced in the literature and in practice. These can be classified according to the technique used for searching within a page. Most implementations are comparison-based in which searching is typically done by performing a binary search on a sorted array of keys. A variety of optimizations have been developed to improve upon this basic scheme. For an overview of such optimizations, see e.g., Graefe, G. and Larson, P. A., "B-Tree Indexes and CPU caches," in 17th International Conference on Data Engineering (ICDE), pages 349–358, Washington-Brussels-Tokyo, April 2001, published by IEEE Computer Society Press.

Radix-based B-Tree variants are less common, with the majority intended for text indexing, not on-line transaction processing (OLTP). These radix-based variants can be further categorized as to whether they manipulate the on disk representation directly or not. Examples in the first group include the string B-Tree (see e.g., Ferragina, P. and Grossi, R. "The string B-Tree: A new data structure for string search in external memory and its applications," Journal of the ACM, 46(2): 236–280, 1999) and the string R-Tree (see e.g., Jagadish, H. V., Koudas, N., and Srivastava, D., "On effective multi-dimensional indexing for strings," in volume 29, pages 403–414 of the Proceedings of the 2000 ACM SIGMOD International Conference on Management of Data, May 16–18, 2000, Dallas, Tex.). They store a compressed linearization of the search structure on disk and reconstruct it on demand. A disadvantage of this approach, particularly in an OLTP environment, is that it complicates buffer management: the reconstructed search structure likely will not fit on a single page. Further, this approach does not solve the problem of constructing a cache-efficient in-memory representation. An example of a radix-based B-Tree variant that manipulates the on-disk representation directly is Ferguson's Bit-Tree (see e.g., Ferguson, D. "Bit-Tree, a data structure for fast file processing," Communications of the ACM, 35(6): 114–120, 1992). Other examples in this group include the pkB-Tree (see e.g., Bohannon, P., McIlroy, P., and Rastogi, R., "Main-Memory index structures with Fixed-Size partial keys," volume 30, 2 of SIGMOD Record, pages 163–174, ACM Press), a Bit-Tree refinement suitable for main memory databases.

Although B-Tree indexes are widely used to improve DBMS performance, they add overhead to the DBMS as a whole and, therefore, these indexes need to be carefully structured and used to maximize system performance, especially when indexing long values. One approach to indexing long values is to store partial key information: keys are represented with a small normalized prefix together with an identifier (ID) of the row containing the key (if needed). If the prefix alone is not sufficient to resolve a comparison, a full compare is performed against the values in the underlying row, an expensive proposition if a cache miss is incurred. While this implementation works surprisingly well for many indexes—trading off the occasional full compare for better fanout—there is room for improvement, especially if the schema is not carefully designed. Further, even with this type of implementation, index size can still be an issue in resource-constrained environments, such as a typical Windows CE environment.

What is required is a solution which enables a database management system to maintain more compact indexes while providing performance equivalent to existing indexing schemes. The present invention fulfills these and other needs.

GLOSSARY

The following definitions are offered for purposes of illustration, not limitation, in order to assist with understanding the discussion that follows.

B-Tree

One of the most widely used indexing schemes in database systems is the B-Tree index scheme (including implementation variants such as a B+-Tree) in which the keys or keywords are kept in a balanced tree structure and the lowest level (i.e., leaf nodes) of the tree points at the data records, or, in some cases, contains the actual data records themselves. General techniques for the construction and operation of B-Trees are well documented in the technical, trade, and patent literature. For a general description, see Sedgewick, R., "Algorithms in C—Third Edition," Addison-Wesley, 1998. For a survey of various B-Tree implementations, see Comer, D., "The Ubiquitous B-Tree," Computing Surveys, Vol. 11, No. 2, June 1979, pp. 121–137. Unless otherwise specified, in this document the term B-Tree includes B-Trees, B+-Trees, and the like.

Index

In a database system, an index is a list of keys or keywords which enable a unique record to be identified. Indexes are typically used to enable specific records to be located more rapidly as well as to enable records to be more easily sorted (e.g., sorted by the index field used to identify each record).

OLTP or Transaction Processing

A transaction processing or OLTP system is a type of computer processing system in which the system responds immediately to user requests. Each user request is considered to be a transaction. Automatic teller machines for banks are one example of a transaction processing system. Transaction processing involves interaction with a user, whereas batch processing can take place without a user being present.

Patricia Tree

A Patricia tree or path-compressed binary trie is a search tree in which each non-leaf node includes a bit offset and has two children. A Patricia tree is based upon a trie structure with each node including the index of the bit to be tested to decide which path to take out of that node. The typical way that a Patricia tree is searched is to start at the root node and the tree is traversed according to the bits of the search key. For example, if a given bit offset is '0', then the search proceeds to the left child of the current node. If the bit offset is '1', then the search proceeds to the right child of the current node. For further information on Patricia trees, see Morrison, D., "PATRICIA—Practical Algorithm to Retrieve Information Coded in Alphanumeric," Journal of the ACM, 15(4): 514–534, 1968, the disclosure of which is hereby incorporated by reference.

SQL

SQL stands for Structured Query Language, which has become the standard for relational database access, see e.g., "Information Technology—Database languages—SQL," published by the American National Standards Institute as American National Standard ANSI/ISO/IEC 9075: 1992, the disclosure of which is hereby incorporated by reference. For additional information regarding SQL in database systems, see e.g., Date, C., "An Introduction to Database Systems, Volume I and II," Addison Wesley, 1990, the disclosure of which is hereby incorporated by reference.

Tree

A tree is a non-empty collection of nodes (or vertices) and edges that satisfies certain requirements. A node (also referred to as a vertex) is a simple object that can have a name and can carry other associated information; an edge is a connection between two nodes. The defining property of a tree is that there is exactly one path connecting two nodes. A rooted tree is one in which one node is designated as the root of the tree. In a rooted tree, any node is the root of a subtree consisting of it and the nodes below it. Each node (except the root) has exactly one node above it, which is called its parent. The nodes directly below a given node are called its children. A leaf node is a node that has no children (or for which all the subtrees are empty). The nodes in the tree that are not leaves are referred to as internal nodes. For further information on trees, see e.g., Sedgewick, R., "Algorithms in C—Third Edition", Addison Wesley, 1998, the disclosure of which is hereby incorporated by reference. In the context of a database system, the leaf node of the tree is typically associated with a data record, which enables access to data records from leaf nodes. By way of example, a data record may be accessed directly (i.e., through a pointer) from the leaf node. The leaf node may also point to a data structure (e.g., a table) which, in turn, enables access to data records. The leaf node may also contain the data record itself. Other variants are, of course, also feasible.

Trie

A trie is a binary tree that has keys associated with each of its leaves defined recursively as follows: the trie for an empty set of keys is a null link; the trie for a single key is a leaf containing that key; and the trie for a set of keys of cardinality greater than one is an internal node with a left link referring to the trie for the keys whose initial bit is 0 and right link referring to the trie for the keys whose initial bit is 1, with the leading bit considered to be removed for purposes of constructing the subtrees. For a description of tries, see e.g., Sedgewick, R., "Algorithms in C—Third Edition", Addison-Wesley, 1998, the disclosure of which is hereby incorporated by reference. Searching a trie typically proceeds from the root to a leaf, where the edge taken at each node depends on the value of an attribute in the query. Typical trie implementations have the advantage of being fast, but the disadvantage of achieving that speed at great expense in storage space. For further information regarding trie structures, see e.g., Comer, D., "Heuristics for Trie Index Minimization," ACM Transactions on Database Systems, Vol. 4, No. 3, September 1979, pages 383–395, the disclosure of which is hereby incorporated by reference.

SUMMARY OF THE INVENTION

An improved method for creating an index based on a path-compressed binary trie in a database system comprising database tables and indexes on those tables is described. For a given index to be created, a path-compressed binary trie for the given index is determined. The path-compressed binary trie comprises internal nodes and leaf nodes. Based on a traversal of the path-compressed binary trie, an index is created comprising a first array of internal nodes encountered during the traversal, and a second array of leaf nodes encountered during the traversal. The database system employs said first and second arrays for providing index-based access for a given key value.

BRIEF DESCRIPTION OF THE DRAWINGS

FIG. 7C depicts a blind search operation on an array representation of a ptree.

DETAILED DESCRIPTION OF A PREFERRED EMBODIMENT

The following description will focus on the presently preferred embodiment of the present invention, which is implemented in general purpose computer system, such as a desktop or server computer running under an operating system, such as the Microsoft® Windows XP operating system. This computer system may be connected to one or more public or private networks, including the Internet. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

I. Computer-based Implementation

A. Basic System Hardware (e.g., for Desktop and Server Computers)

Figure 1:
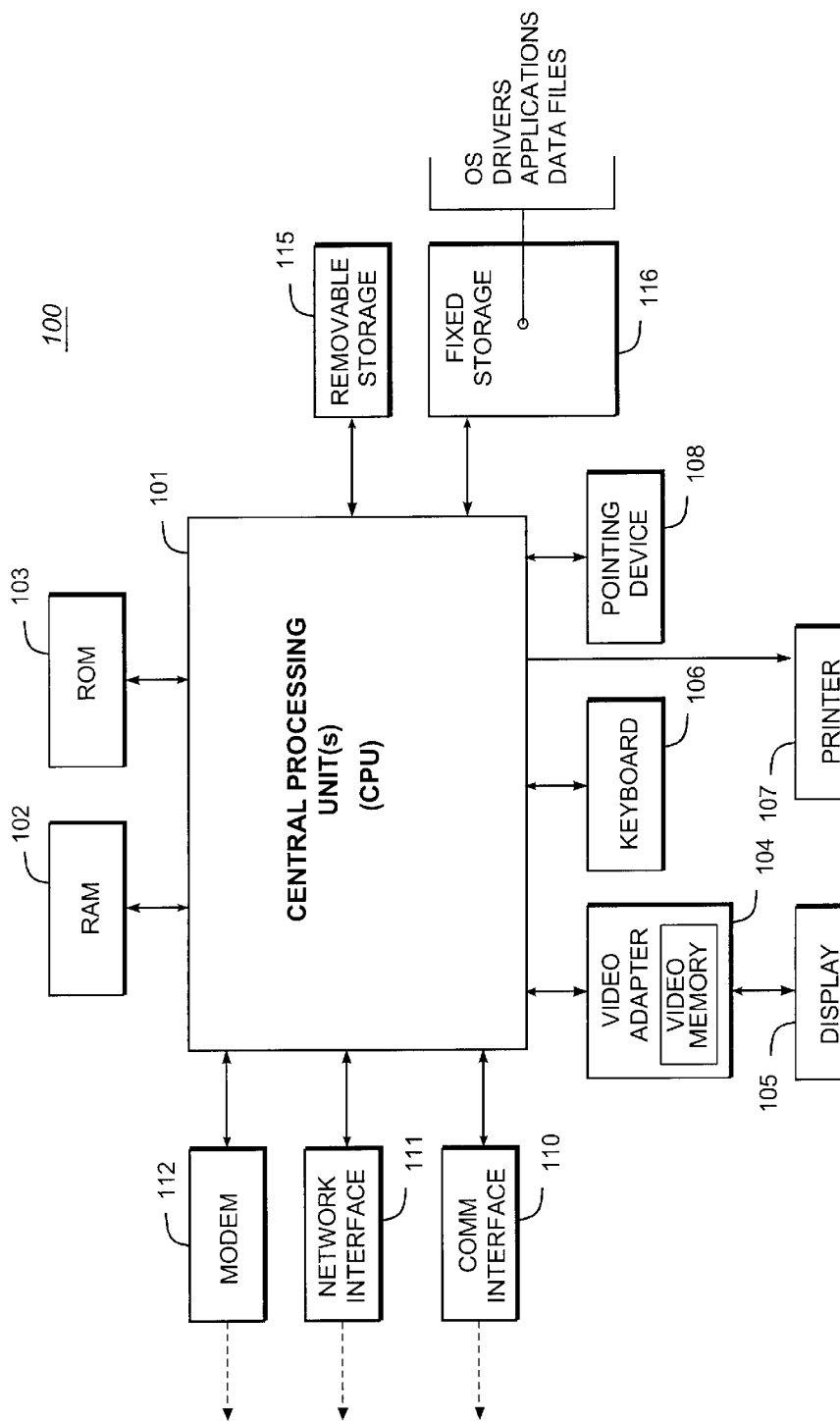
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
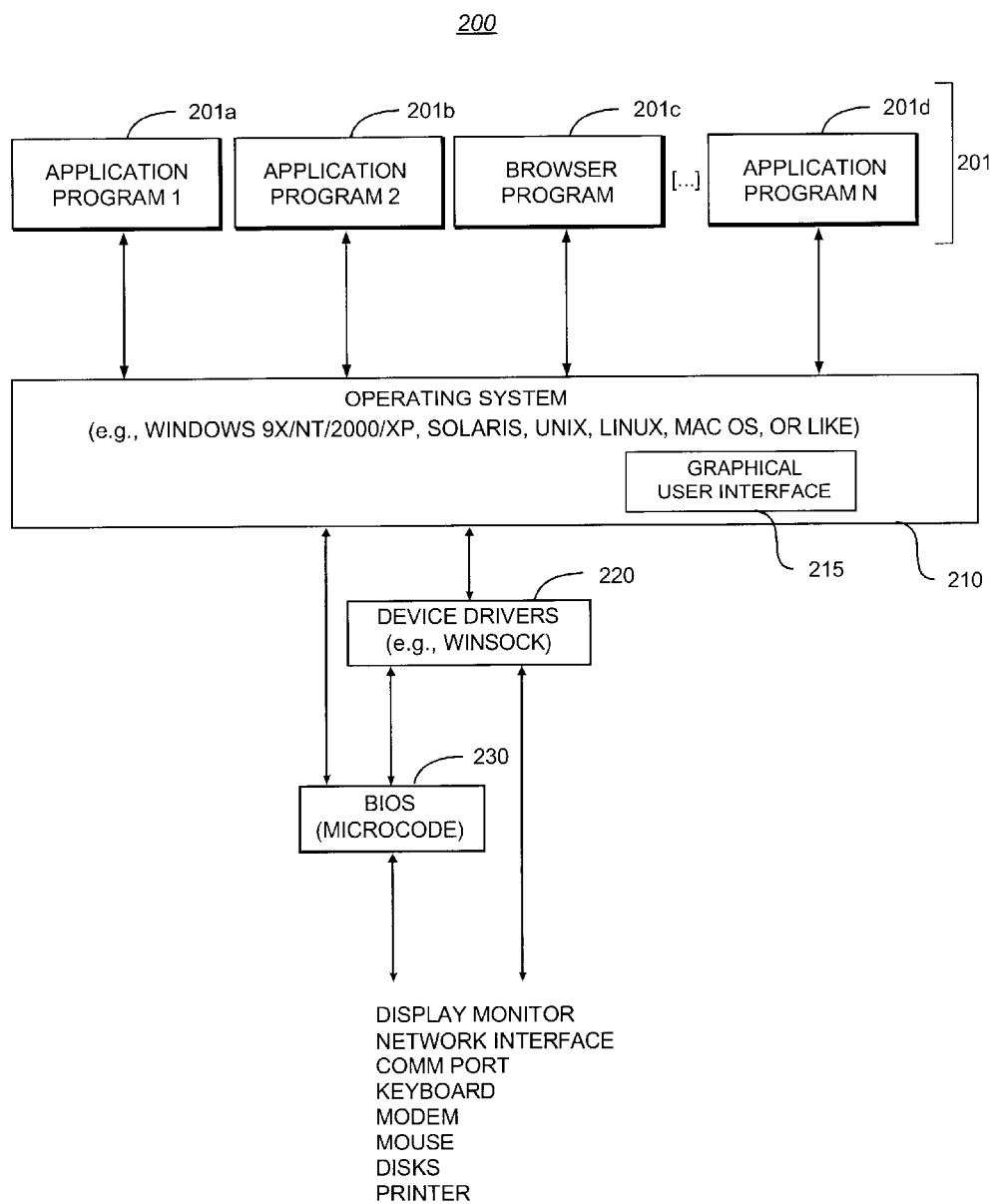
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) maybe "loaded" (i.e., transferred from fixed storage 116 into memory 102) for execution by the system 100.

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft®

Windows XP, all available from Microsoft Corporation of Redmond, Wash. Alternatively, OS 210 can also be an alternative operating system, such as the previously-mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers such as the above-described system 100). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

C. Client/Server Database Management System

Figure 3:
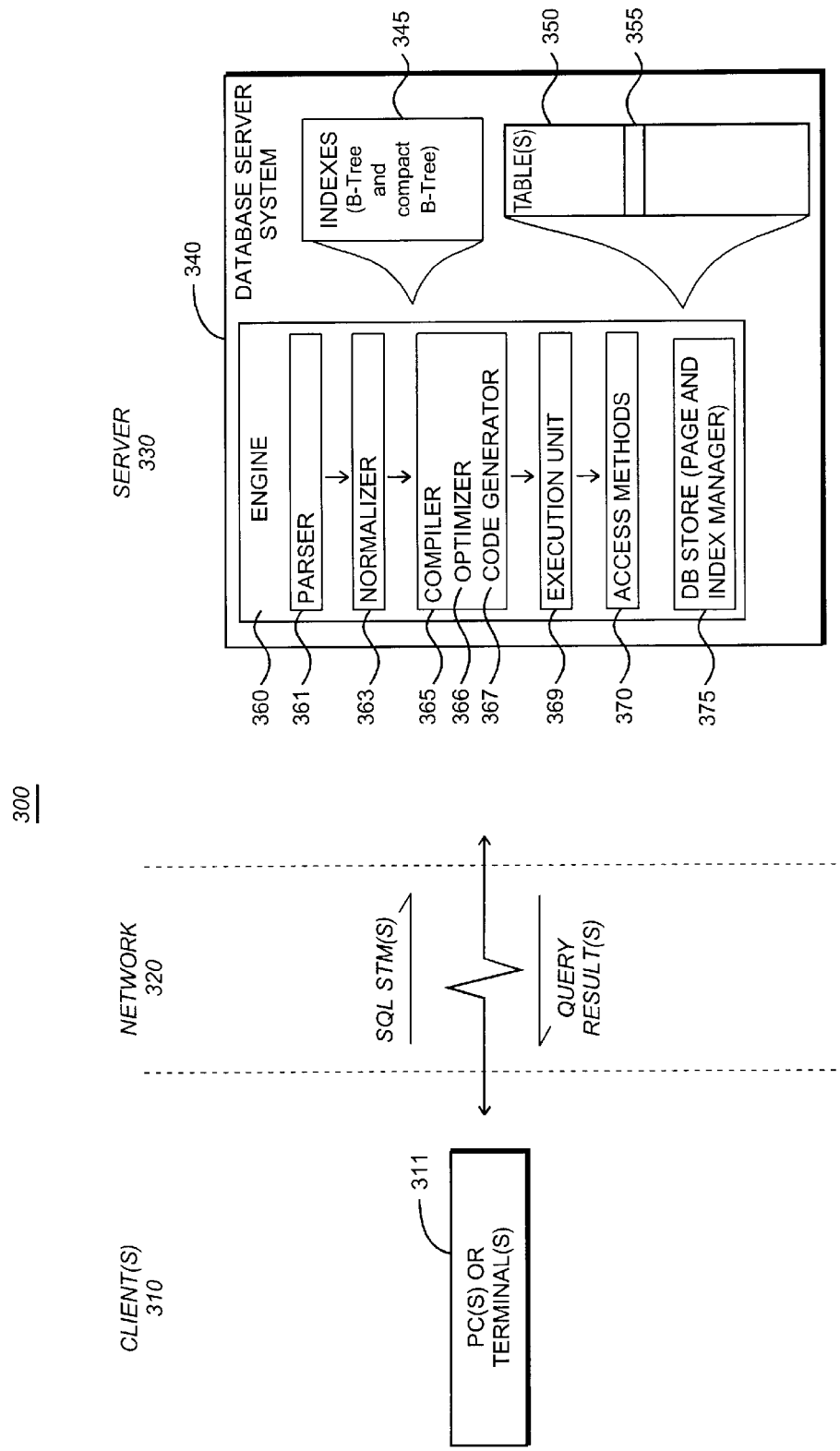
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as Microsoft® Windows client operating system (e.g., Microsoft® Windows 95/98, Windows 2000, or Windows XP).

The database server system 340, which comprises Sybase® Adaptive Server® Anywhere (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), or UNIX (Novell). The network 320 may be any one of a number of conventional network systems, including a Local Area Network (LAN) or Wide Area Network (WAN), as is known in the art (e.g., using Ethernet, IBM Token Ring, or the like). Network 320 includes functionality for packaging client calls in the well-known SQL (Structured Query Language) together with any parameter information into a format (of one or more packets) suitable for transmission across a cable or wire, for delivery to the database server system 340.

Client/server environments, database servers, and networks are well documented in the technical, trade, and patent literature. For a discussion of Sybase®-branded database servers and client/server environments generally, see, e.g., Nath, A., "The Guide to SQL Server," Second Edition, Addison-Wesley Publishing Company, 1995. Additional documentation of Sybase® SQL Anywhere® Studio version 8.0 (Adaptive Server® Anywhere) is available from Sybase, Inc. as "SQL Anywhere Studio 8.0 Collection Documentation" (e.g., at http://sybooks.sybase.com/awg0800e.html).

In operation, the client(s) 310 store data in, or retrieve data from, one or more database tables 350, as shown at FIG. 3. Typically resident on the server 330, each table itself comprises one or more rows or "records" (tuples) (e.g., row 355), each storing information arranged by columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the clients 310 issue one or more SQL commands to the server 330. SQL commands may specify, for instance, a query for retrieving particular data (i.e., data records meeting the query condition) from the database table(s) 350. The syntax of SQL (Structured Query Language) is well documented; see, e.g., the above-mentioned "An Introduction to Database Systems." In addition to retrieving the data from Database Server tables, the Clients also include the ability to insert new rows of data records into the table; Clients can also modify and/or delete existing records in the table(s).

In operation, the SQL statements received from the client(s) 310 (via network 320) are processed by engine 360 of the database server system 340. Engine 360 itself comprises parser 361, normalizer 363, compiler 365, execution unit 369, access methods 370, and page manager 375. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer can also look-up any referential integrity constraints which exist and add those to the query.

After normalization, the query tree is passed to the compiler 365, which includes an optimizer 366 and a code generator 367. The optimizer is responsible for optimizing the query tree. The optimizer performs a cost-based analysis for formulating a query execution plan. The optimizer will, for instance, select the join order of tables (e.g., when working with more than one table); it will select relevant indexes (e.g., when indexes are available). The optimizer, therefore, performs an analysis of the query and picks the best execution plan, which in turn results in particular ones of the access methods being invoked during query execution.

For enhancing the storage, retrieval, and processing of data records, the server 330 maintains one or more database indexes 345 on database tables 350. These database indexes 345 facilitate quick access to the data records. A database index, typically maintained as a B-Tree data structure, allows the records of a table to be organized in many different ways, depending on a particular user's needs. An index may be constructed as a single disk file storing index key values together with unique record numbers. As previously described, an index key value is a data quantity composed of one or more fields from a record which are used to arrange (logically) the database file records by some desired order (index expression). The record numbers are unique pointers to the actual storage location of each record in the database file. Both are referred to internally by the system for locating and displaying records in a database file. Of particular interest at FIG. 3, the indexes 345 may include both conventional comparison-based B-Trees as well as Patricia tree-based B-Trees constructed in accordance with the present invention which are referred to herein as "compact B-Trees." These compact B-Trees are Patricia tree-based (or trie-based) indexes constructed in accordance with the present invention as hereinafter described in detail.

As clients insert more and more data into the table(s) 350, the indexes 345 continue to grow. Two parts of the server 330 play a role in the processing and maintenance of the indexes: the access methods 370 and the DB store 375. The DB store 375, which includes a page and index manager module, includes interfaces (or submodules) for the following index operations: create, insert, delete, reorganize, and search. The create submodule is used to create an index (e.g., bulk load operation). The insert submodule is used for inserting an index entry, while the delete submodule is used for deleting an index entry. The reorganize module is used to improve the space utilization of an index by packing the index entries more tightly. The search submodule functions to find a particular key value in a tree. The B-Tree insert, delete and search operations can be viewed as starting with a B-Tree search, starting from the root node or page of the B-Tree. Searching for a particular record in the B-Tree occurs by traversing a path in the B-Tree, searching each page encountered for the key value sought. The insert submodule serves to insert a new entry into a B-Tree. Once the leaf level is reached, if enough space does not exist (e.g., for insertion), then a B-Tree split routine is invoked for splitting a B-Tree page. In the currently preferred embodiment, splits propagate from the top down. Traversal operations in the currently preferred embodiment also proceed from top to bottom. The system and method for providing the compact B-Trees of the present invention will now be described.

II. System and Method for Providing Compact B-Tree Indexes

A. Indexes and B-Trees

Figure 4:
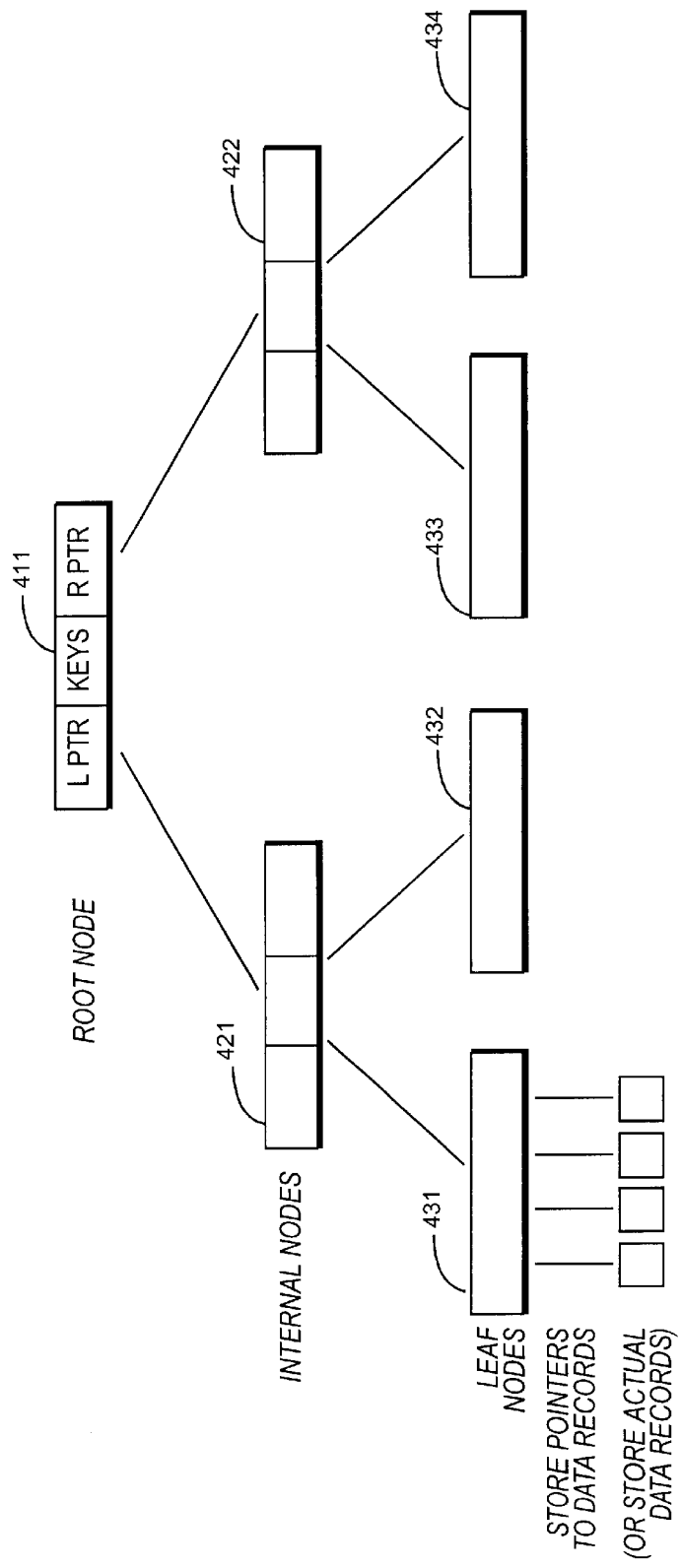
FIG. 4 is a diagram of a simple B-Tree index.

B-Trees are fundamental to the maintenance of indexes. FIG. 4 illustrates a simple B-Tree 400, which comprises a root node 411, internal nodes 421, 422, and leaf (terminal) nodes 431, 432, 433, 434. As shown, therefore, a B-Tree consists of a plurality of nodes arranged in a tree. Each node may, in turn, be thought of as a block of records. As shown by the root node 411, each node stores one or more key values ("keys") together with pointers to children nodes (e.g., nodes 421, 422 for root node 411).

Searching for a particular record in the B-Tree occurs by traversing a particular path in the tree. To find a record with a particular key value, one would maneuver through the tree comparing key values stored at each node visited with the key value sought. The results of each comparison operation, in conjunction with the pointers stored with each node, indicate which path to take through the tree to reach the record ultimately desired. Ultimately, a search will end at a particular leaf node, such as leaf node 431. The leaf node will, in turn, point to (i.e., store a pointer to or identifier for) a particular data record for the key value sought. Alternatively, the leaf nodes may for "clustered indexes" store the actual data of the data records on the leaf nodes themselves.

B. Overview

The present invention comprises a system and method providing a compact, Patricia tree-based B-Tree index. In a compact B-Tree index constructed in accordance with the present invention, each page of the B-Tree contains a local Patricia tree instead of the usual sorted array of keys. The search structure used may also be described as a "path-compressed binary trie." For further information on Patricia trees, see Morrison, D., "PATRICIA—Practical Algorithm to Retrieve Information Coded in Alphanumeric," Journal of the ACM, 15(4): 514–534, 1968. Also see e.g., Nilsson, S. and Tikkanen, M., "Implementing a dynamic compressed trie," in Proceedings Workshop on Algorithm Engineering (WAE) 1998, Saarbrucken, Germany, August 20–22, pages 341–350. Following the literature, this document refers to this path-compressed binary trie as a "Patricia tree." Utilization of a Patricia tree representation provides a B-Tree variant that, while compact, is efficient to manipulate directly and provides significant space and performance benefits over existing B-Tree indexes. The following discussion first generally describes Patricia trees. The methodology of the present invention for providing compact B-Trees is then described.

The present invention comprises a new B-Tree variant referred to herein as a "compact B-Tree" which is designed to improve the space and time performance of indexes. The compact B-Tree indexes of the present invention are based on a radix-based search, designed so that references to indirectly stored keys are likely not to incur additional cache misses in the common case. For information on radix-based search, see, e.g., Sedgewick, R., "Algorithms in C—Third Edition", Addison Wesley, 1998. For additional information regarding radix-based routines, see e.g., commonly-owned U.S. Pat. No. 5,924,091 titled "Database system with improved methods for radix sorting." While it is natural to expect good relative performance for longer keys, experience has shown that this approach is competitive even for small key sizes.

The implementation of compact B-Trees is intentionally simple and addresses the problems of large indexes in resource-constrained environments. In addition, the system and method of the present invention does not require user tuning to achieve good performance.

C. Background Database Environment

1. Sample Table

The following discussion uses as an example a table consisting of a set of N records, each of the form $r_i=(k_i, \alpha_i)$ in which $k_i$ is called the key, $\alpha_i$ the associated information, and i the record identifier or rid. An index on the table provides an ordering on the rids $i_1, i_2, \ldots, i_N$ such that $k_{i1} \leq k_{i2} \leq \ldots \leq k_{iN}$. The index operations of interest are:

| | |
|---|---|
| find (k) | Returns $i_j$, eq(k, $k_{ij}$), and a handle $h_j$ for the least j for which $k_{ij} \geq k$. |
| next (k, $h_j$) | Returns $i_{j+1}$, eq(k, $k_{ij+1}$) and $h_{j+1}$. |
| insert ($k_j$, j) | Adds $r_j$ to the index. |
| delete ($k_j$, j) | Removes $r_j$ from the index. |

In the above, a handle $h_j$ can be viewed as denoting the position of the jth index entry and eq is a Boolean function returning true if its arguments are equal. The most common operations by far are find and next. Most find(k) operations succeed (i.e., k=$k_j$ for some j). Within reason, improving the performance of find and next at the expense of insert and delete is a good tradeoff. Although clustered indexes are not described in these examples, the system and method of the present invention can easily be adapted for use with clustered indexes.

2. Keys

Without loss of generality, it is assumed that the keys $k_i$ appearing in an index are unique. If not, the rid of the record that the key appears in can always be appended (i.e., an index formed on $(k_i, i)$). This approach is appropriate in any case since the appropriate index entry will need to be updated when a particular row is updated or deleted. See e.g., Graefe and Larson "B-Tree indexes and CPU caches," above.

It is also assumed that all keys can be normalized to binary strings in an order preserving fashion. Therefore, the focus of the present discussion is restricted to indexing these strings. One consequence of this assumption is that the indexes described in this document are not able to index all possible database values. In particular, it is not always feasible to construct an order preserving normalization for Java programming language values.

Further, it is assumed that the normalization is such that no key is a prefix of another. This is trivially so for fixed length keys. For variable length keys an end marker needs to be added in an order preserving fashion. Conceptually, all keys are padded with binary '1's to M bits, where M is greater than the length in bits of any key that could possibly be encountered. Binary '1's are added instead of '0's because this gives a convenient representation for a value greater than any naturally occurring key. This simplifies the algorithms allowing keys to be padded for alignment at will.

To summarize, in the following discussion it is assumed that a key k is a binary string of the form $b_1 b_2 \ldots b_M$. The term $k[i]$ will be used for $b_i$ and $k[i:j]$ for $b_i, b_{i+1}, \ldots b_j$. A key $k_1$ is less than a key $k_2$ if there exists a j such that $k_1[1:j-1]=k_2[1:j-1]$ and $k_1[j]<k_2[j]$.

3. B-Trees

A B-Tree is a multi-way tree in which all leaves appear on the same level. As with most implementations, no guarantee is provided regarding page utilization since a free-at-empty rather than merge-at-half approach is utilized in the currently preferred embodiment. For further information, see e.g., Johnson, T., and Shasha, D., "B-Trees with inserts and deletes: Why free-at-empty is better than merge-at-half," Journal of Computer and System Sciences, 47(1): 45–76, 1993.

Figure 5A:
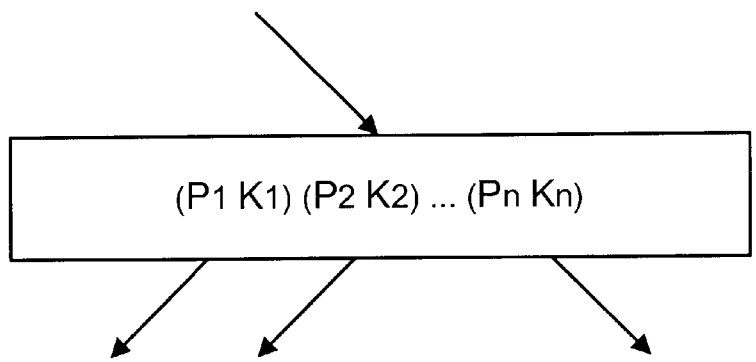
FIG. 5A illustrates an exemplary B-Tree page.

A B-Tree page is either a leaf page or an internal page. Internal pages contain pointers to child pages (page ids or pids), leaf pages contain pointers to records (record ids or rids). Each pointer in a B-Tree page has an associated key. The key associated with record id i is just $k_i$. B-Tree pages can be represented as illustrated in FIG. 5A. FIG. 5A illustrates a B-Tree page 510 in which $K_1<K_2<\ldots<K_n$ and Pi points to a subtree with rows containing keys in the range $(K_{i-1}, K_i)$. Typical B-Tree implementations omit the last key from nonleaf pages. In the currently preferred embodiment, the last key is retained in order to simplify the implementation at negligible cost. While the keys in leaf pages must be row values, various key values may be used for the internal pages, so long as they satisfy the above criteria.

The index operations listed above can be implemented in terms of the following operations on B-Tree pages:

| | |
|---|---|
| find (K) | Returns j and eq(K, Kj) for the least j for which $Kj \geq K$. |
| insert ( (PK) , j) | Inserts (PK) as the jth entry in the page. |
| delete (j) | Removes $(P_j K_j)$ from the page. |
| split (i) | Splits the page into $((P_1 K_1) \ldots (P_i K_i))$ and $((P_{i+1} K_{i+1}) \ldots (P_n K_n))$. |
| merge (l, r) | Forms $((P^1_1 K^1_1) \ldots (P^1_{nl} K^1_{nl})) (P^r_1 K^r_1) \ldots (P^r_{nr} K^r_{nr}))$. One must have $K^1_{nl} < K^r_{nr}$. |

For a description as to how these index operations can be implemented in terms of the page level operations, see e.g., Sedgewick, R., "Algorithms in C++," Addison-Wesley, 1998, or Knuth, D., "Sorting and Searching," volume 3 of The Art of Computer Programming, Addison-Wesley, Reading, Mass., USA, second edition, 1998. When the search structure consists of a sorted list of keys, these page level operations are trivial. However, this is no longer the case when the search structure is a Patricia tree.

4. Patricia Trees a) Structure of Patricia Trees

Generally, a Patricia tree or path-compressed binary trie is a search tree in which each non-leaf node includes a bit offset and has two children. The typical way that a Patricia tree is searched is to start at the root node and examine the bit at the specified offset to determine if it is zero ('0') or one ('1'). If the bit offset is '0', then the search proceeds to the left child of the current node. If the bit offset is '1', then the search proceeds to the right child of the current node. When the next node is visited, the bit at the offset specified in this node is examined. Based upon whether the bit being examined is a '0' or '1', the search proceeds to the left or to the right. The search continues in this fashion until a leaf is reached.

It is convenient to describe Patricia trees recursively. A Patricia tree is either a leaf L(k) containing a key k or a node N(d, l, r) containing a bit offset d>0 along with a left subtree l and right subtree r. All leaves descended from N(d, l, r) must agree on the first d−1 bits; all leaves descended from the left child l must have a '0' as the dth bit and all leaves descended from the right child r must have a '1' as the dth bit. This definition is similar to that used by Sedgewick ("Algorithms in C," above), but differs from that of Knuth ("Sorting and Searching," above) in that the absolute bit offset is stored in the node rather than the number of bits skipped. A leaf of a Patricia tree is identified with the key it holds.

Figure 5B:
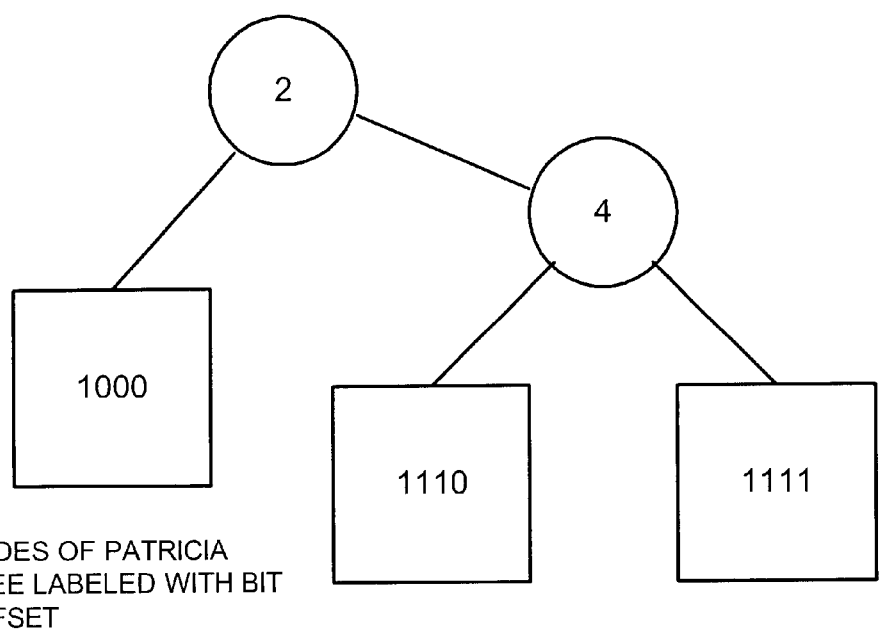
FIG. 5B illustrates an exemplary Patricia tree.

FIG. 5B illustrates an exemplary Patricia tree 520. As shown, the nodes of the Patricia tree are labeled with the bit offset. The following observations about Patricia trees are easily established with structural induction:

Observation 1. The bit offsets in the nodes must increase as a path from the root to a leaf is followed.

Observation 2. The number of internal nodes in a Patricia tree is always one less than the number of leaves. One can say that a leaf a is to the left of another leaf b, or a appears before b, if an in-order traversal of the tree visits a before b.

Observation 3. A leaf a is to the left of a leaf b if the key in the leaf a is less than the key in the leaf b.

Observation 4. The offset of the first bit at which two keys differ is the bit offset found in their lowest common ancestor. The importance of these observations to the methodology of the present invention is described below.

b) Elementary Operations (1) Blind Search

Figure 5C:
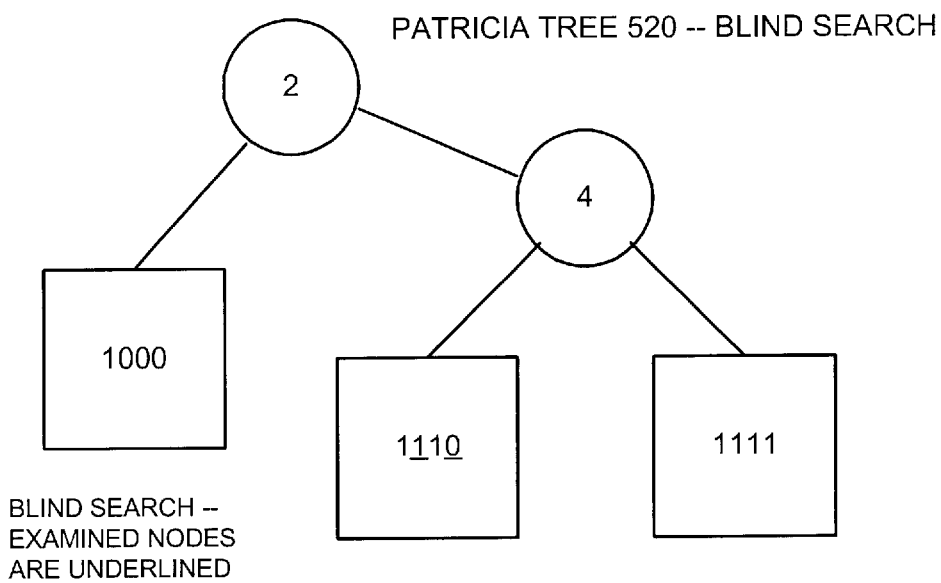
FIG. 5C illustrates a blind search for a node in the Patricia tree of FIG. 5B.

Given the key $k_i$ stored in a leaf $L(k_i)$, one can find the leaf by doing a blind search from the root node. If a node N(d, l, r) is encountered, the search continues on to l if $k_i[d]=0$ and r otherwise. FIG. 5C illustrates a blind search for the node 1110 in the Patricia tree 520 of FIG. 5B. The examined bits of node 1110 are underlined at FIG. 5C.

(2) Insert

Figure 5D:
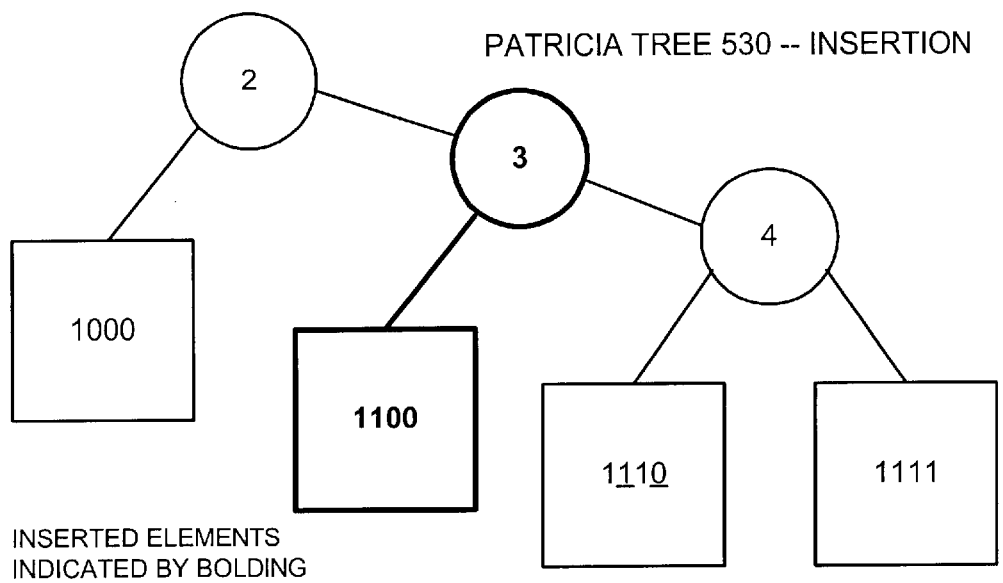
FIG. 5D depicts the insertion of a node into the Patricia tree of FIG. 5C.

To insert a value $k_i$, a blind search is performed to find a leaf $L(k_j)$. The key $k_j$ agrees with $k_i$ on all of the bits tested on the path from the root to $k_j$, but $k_i$ must differ from $k_j$ at some bit position since all keys are distinct. Let d be the first differing bit position. If a node N(d', l', r') is encountered during the blind search with d'>d, then let the subtree s be the first such node; otherwise, let $s=L(k_j)$. If $k_i[d]=0$, then insert a new node N(d, $L(k_i)$, s); otherwise, insert a node N(d, s, $L(k_i)$). FIG. 5D illustrates the insertion of a node 1100 into the Patricia tree of FIG. 5C. The added elements are bolded in the Patricia tree 530 at FIG. 5D.

(3) Search

For a search for a given key k, one would like to find the leaf $f=L(k_j)$ such that $k_j$ is the smallest key where $k_j \geq k$. This requires an approach similar to that described above for the insertion operation. Let d and s be determined as above. If k[d]=0, then f is the leftmost leaf of s as in FIG. 5D. Otherwise, f is the leaf immediately to the right of (the rightmost leaf of) the subtree s. Searching for 1010 also finds 1110 by first doing a blind search to 1000, then determining that f is the leaf immediately to the right of 1000, namely 1110.

(4) Delete

Given a key k, the delete operation finds and removes L(k) from the tree. If the tree consists only of L(k), then the result is the empty tree. Otherwise, there is either a node n=N(d, L(k), s) or n=N(d, s, L(k)). Delete consists of removing node n and replacing it with s.

(5) Splitting and Merging

In addition to the usual operations on a Patricia tree, a way is required to split a tree in two (in the cases where a tree no longer fits on a disk page). In addition, a process for merging two trees together is also needed (in cases where space left due to deletes is being reclaimed).

Given two adjacent leaves $L(k_i)$ and $L(k_{i+1})$, the split operation returns two Patricia trees, $T_1$ containing $L(k_i)$, and $T_2$ containing $L(k_{i+1})$ such that $T_1$ and $T_2$ contain all of the leaves of the original tree. If d is the first bit position at which $k_i$ and $k_{i+1}$ differ, then node N(d, l, r) is a node which will be removed by the split operation. The tree $T_1$ consists of the root node and all nodes which are the left child of a node on the path from the root to d, along with d's left child l. Similarly, the tree $T_2$ consists of all nodes which are the right child of a node on the path from the root to d, along with d's right child r.

The merge operation is the inverse of the split operation. Given two Patricia trees $T_l$ and $T_r$, with $T_l$ to the left of $T_r$ (i.e., if $k_l$ is the rightmost key of $T_l$ and $k_r$ is the leftmost key of $T_r$, then $k_l < k_r$), the merge operation forms the Patricia tree containing the combined set of keys. It merges the paths to $k_l$ and $k_r$ such that the bit offsets along the resulting path are in increasing order. It proceeds until it arrives at subtrees l and r in $T_l$ and $T_r$, respectively, that are either leaves or are rooted by a node containing a bit offset greater than the offset d of the first bit at which $k_l$ and $k_r$ differ. At this point a new node N(d, l, r) is inserted. This approach guarantees that the bit offsets along the merged path are distinct since all of the keys in $T_l$ are less than all of the keys in $T_r$.

D. A Compact Patricia Tree Representation

Any representation of a Patricia tree must encode the bit offsets found in the internal nodes and the shape of the tree. The present invention provides a method for recovering the shape of a Patricia tree from the offsets alone, if these offsets are listed as encountered in an in-order traversal of the tree. The only information required to merge two Patricia trees whose ordering is known (i.e., it can be determined which tree is the left and which is the right) is the offset of the first bit in which the neighboring keys differ. Recall from observation 4 above that the offset of the first bit at which two keys differ is the bit offset found in their lowest common ancestor. Thus, the list of bit offsets encountered in an in-order traversal of a Patricia tree is simply a list of the offsets at which consecutive keys first differ. Viewing each leaf as a separate subtree, the original Patricia tree can be reconstructed simply by repeatedly merging the leaves until the reconstruction process results in a single tree.

This representation has been previously described in the literature (see e.g., Ferguson. "Bit-tree, a data structure for fast file processing," above). However, this correspondence has been overlooked. Given this correspondence, it is less surprising that searching a Bit-Tree requires only one key access (see e.g., Bohannon, P., McElroy, P., and Rastogi, R., "Main-Memory index structures with Fixed-Size partial keys," volume 30, 2 of SIGMOD Record, pages 163–174, ACM Press). Ferguson implements the above-mentioned Patricia tree operations directly on the list of distinction offsets. Of these, only the implementation of search is non-trivial and requires a scan of the entire page. While this is reasonable for small page sizes (such as found in main memory databases, where the B-Tree nodes are roughly the size of a cache line) it impacts performance when the page size is large.

The compact B-Tree of the present invention provides an improved Patricia tree encoding that trades off compactness for speed of search. This compact B-Tree structure uses a Patricia tree within each page. It should be noted that the compact B-Trees of the present invention are not of a fixed order and, therefore, should not be confused with those of Rosenberg and Snyder (see e.g., Rosenberg, A., and Snyder, L. "Time- and space-optimality in B-Trees," ACM TODS, 6(1): 174–193, 1981). The following discussion describes the compact B-Tree of the present invention in greater detail.

E. The Compact B-Tree

1. Representing Keys

The idea of using Patricia trees within B-Tree pages requires a decision about how to represent the keys, and how to encode the Patricia tree. Recall that the Patricia tree stores keys for each of the leaf nodes. A naive implementation of this approach is unlikely to do better than a comparison based approach. As long as the ordering of the keys can be recovered, a search can be performed in logarithmic time without any recourse to the Patricia tree. Therefore, the additional bookkeeping that would be required to maintain a Patricia tree in this situation is avoided.

Instead of storing the keys in the pages of the index, the method of the present invention is to instead store a pointer to the key, which is stored on another disk page. One potential issue with this approach is that de-referencing the pointer may cause a cache miss, thereby resulting in an input/output (I/O) page read latency. One full key comparison is needed per level of the index; if each of these required waiting for a read request, then the compact B-Tree index would behave substantially worse than existing implementations.

One approach to avoid this cost is to try to avoid full comparisons. This is the approach taken by pkB-Trees (see e.g., Rosenberg and Snyder, "Time-and space-optimality in B-Trees," above), in which a small fragment of each key is stored with each leaf. Usually, this fragment is enough to avoid following a pointer to do a full comparison operation. Although this approach does avoid many full comparison operations, it does so at the expense of increasing the information stored in each node, and thus decreasing the fan out.

Another approach is to try and place keys on pages that are likely to already be in the cache or on pages that will likely be needed in the near future. In either of these cases, the extra cache miss resulting from following the key pointer is eliminated. Instead of using extra overhead to store an additional key pointer for each leaf in the Patricia tree, it is natural to re-use the pointers that are already stored in the tree. These pointers are descendant pointers for internal pages and rids for leaf pages.

For heavily used indexes, it is quite likely that all internal pages will be available in the buffer cache due to high fan-out. Even when a full compare is performed to a page that is not currently in the buffer cache, there is some probability that the requested page is the next page required by the search, in which case there is no additional penalty.

For leaf pages, keys are stored in the associated rows. A successful search will do a full compare with the matching row. If values need to be retrieved from the matching row in the near future, the full compare likely does not impose an additional cache miss since it prevents a cache miss when reading the row. In the currently preferred embodiment, the matching row is retrieved immediately after searching in the index. This characteristic means that successful searches never cause an additional cache miss doing a full compare with the matching row in the database.

2. Representing Patricia Trees

In addition to the issue of how to store keys in the index pages, the representation of Patricia trees must also be determined. The disk-based representation should be compact in order to achieve good fan-out. However, it is also desirable to have logarithmic search behavior on average. If one was willing to settle for linear search behavior, the Bit-Tree encoding described above is a good alternative. Given that the shape of a Patricia tree is determined by the data, linear behavior cannot be avoided in all cases. For example, the set of keys $k_i$, where $k_i[j]=0$ for all j but i, produces a right-deep tree.

One implementation alternative is to represent internal nodes by a structure containing the discriminating bit offset and pointers to the left and right sub-trees. This representation clearly supports operations in logarithmic time on average. However, the present invention utilizes another approach which enables a much smaller representation while also providing logarithmic behavior.

Figure 6:
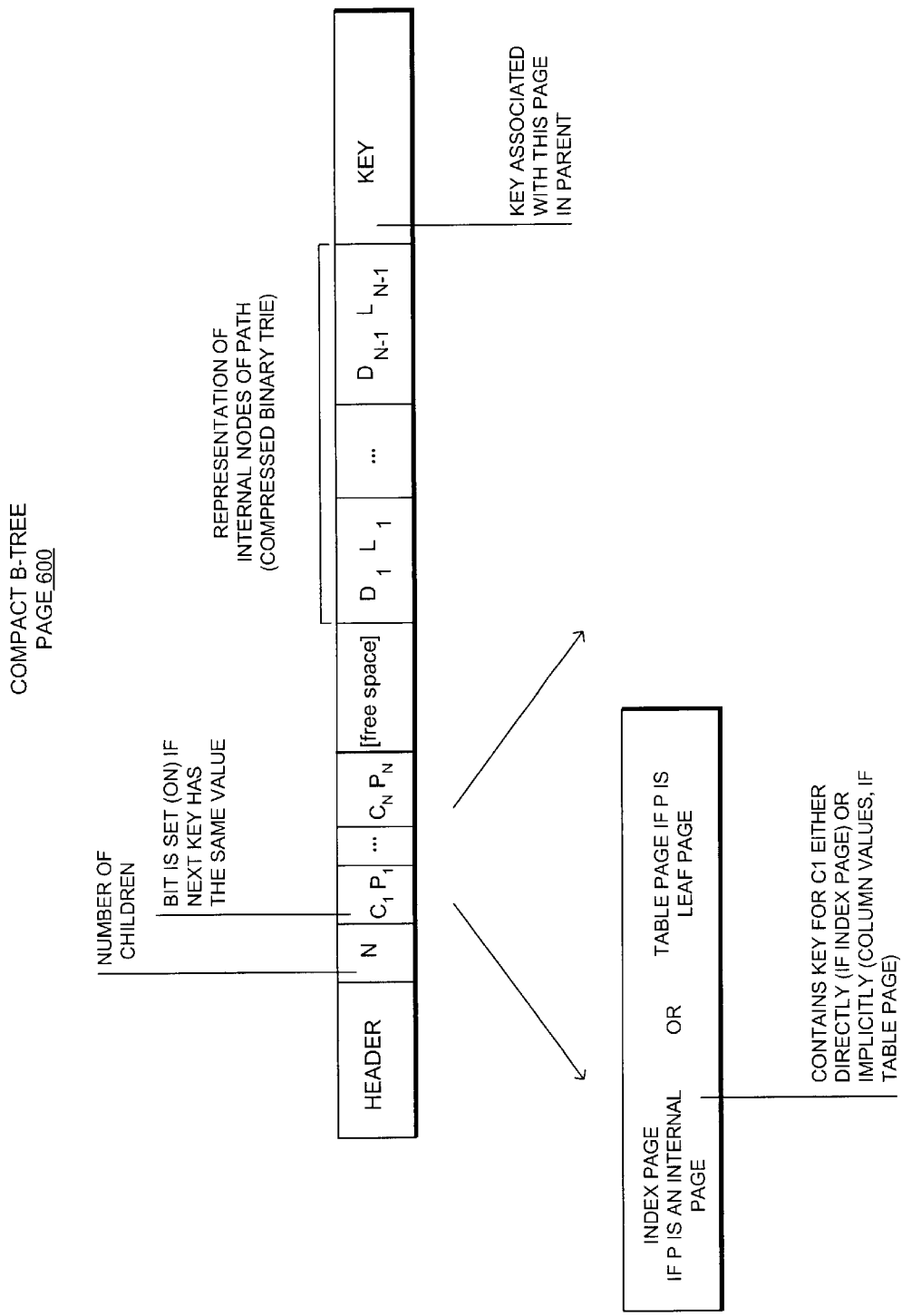
FIG. 6 illustrates an exemplary compact B-Tree page constructed in accordance with the present invention.

FIG. 6 illustrates an exemplary compact B-Tree index page 600 constructed in accordance with the present invention. As shown, the method of the present invention is to store each Patricia tree as an ordered array of leaves together with an array that encodes the structure of the internal nodes of the Patricia tree. The leaf array simply holds the bit $C_i$ and the pointers $P_i$, where $C_i$ is the bit that indicates the next key is equal in value to this key and $P_i$ is the pointer to the key value. The bit $C_i$ is maintained only for leaf pages. The node array stores the bit offset D and number of leaves L in the left subtree as encountered in a pre-order traversal. In addition to the two arrays, each page also stores a header block, the total number of leaves N, and a key chosen by the page splitting algorithm. Note that the key, if it exists, is the value associated with the pointer to this page in the parent page. The key is an upper bound for the values referenced by the $P_i$ and a strict lower bound for the values on the page to the right. As described below in the discussion regarding splitting, the lower bound requirement can be relaxed for pages that are rightmost children.

One advantage of this representation is that one can trace the path from the root to the ith leaf simply with the knowledge of i. In the currently preferred embodiment, the header is 30 bytes, N takes 4 bytes, $D_i$ and $L_i$ are 2 bytes each, and the leaf array entries ($C_iP_i$) are 4 bytes for internal pages and 5 bytes for leaf pages. The maximum fan-out for internal pages is given by ⅛ (page size-key size-34). For example, with a 4K page size and 200 byte key, the internal pages can have a fan-out of 482 and leaf pages can have a maximum fan-out of 429. This compares favorably with existing B-Tree implementations with the same parameters.

The Patricia tree can be reconstructed on a compact B-Tree page with T (1, 1, N), where T is defined as follows:

```
1:   T (i,j,n)
2:     if n = 1 then
3:       return L(P_i)
4:     else
5:       return N(D_j, T(i, j + 1,L_j), T(i + L_j, j + L_j, n − L_j))
6:     fi
```

Here j is the node currently being visited, i is the index of its leftmost leaf and n is number of leaves it contains. When applied to the following representation, the Patricia tree illustrated in FIG. 5B is obtained:

| header | 3 | {1000} {1100} {1111} | [2 1] [4 1] | key |

In the above example, {x} denotes a pointer to key x. While it is possible to reconstruct the tree, it is more efficient to manipulate the representation directly. This avoids the memory management problems as well as the administrative cost associated with expanding the tree. In order to manipulate the compact encoding directly, the operations on Patricia trees need to be defined to operate instead on the encoding.

3. Page Operations a) Searching (1) Blind Search

Performing a blind search on the encoding for a key K proceeds by keeping track of the current node j and, for the subtree rooted at j, the leftmost leaf i and number of leaves n it contains. When visiting an internal node j, the search proceeds to the left if the $D_j$th bit in K is '0' and to the right otherwise.

```
1:   B(K)
2:     i ← 1; j ← 1; n ← N
3:     while n > 1 do
4:       if K[D_j] = 1 then
5:         i ← i + L_j; j ← j + L_j; n ← n − L_j
6:       else
7:         j ← j + 1; n ← L_j
8:       fi
9:     od
10:    return i
```

As previously described, a blind search of a Patricia tree or path-compressed binary trie structure typically starts at the root node with an examination of the bit at the specified offset to determine if it is zero ('0') or one ('1'). Based upon whether the bit being examined is a '0' or '1', the search proceeds to the left or to the right. This process continues until a leaf node is reached. This is a radix-based approach in which bits are examined rather than the whole key comparisons which are typically used in conventional B-Tree index schemes.

(2) Search

Searching the encoding for a key K consists of first performing a blind search which finds leaf k in the manner described above. One then compares K to the key $K_j$ which is pointed to by pointer $P_k$ using a function D ($k_1$, $k_2$) that returns the offset d at which two keys $k_1$ and $k_2$ differ, as well as k1[d]. (Note that if $k_1=k_2$, M and 1 are returned). If the two keys match, then in fact the correct leaf was chosen (this is always the case for successful searches). Otherwise, the appropriate leaf that is greater than K must be found. This is done this by retracing the path followed by the blind search until locating a leaf or a node whose bit offset is greater than d, the offset of the first bit at which K and the $K_j$ differ. There is no need to inspect any bits of either K or $K_j$ in the second pass: the leaf index provides enough information to recover the path. The following second pass proceeds in a manner similar to the blind search code described above, except that k, the index of the searched-for leaf relative to the first leaf in the current subtree, is also maintained.

```
1:    S(K)
2:    k ← B(K)
3:    d, b ← D(K, P_k)
4:    i ← 1; j ← 1; n ← N
5:    while n > 1 ∧ D_j ≦ d do
6:        if k ≧ L_j then
7:            k ← k - L_j; i ← i + L_j; j ← j + L_j; n ← n - L_j
8:        else
9:            j ← j + 1; n ← L_j
10:       fi
11:   od
12:   if b > 0 then
13:       return i + n
14:   else
15:       return i
16:   fi
```

In other words, when the leaf node is reached through a blind search, the search may or may not have reached the correct value. When the search reaches a leaf node, it is known that the key being searched for and the key associated with the leaf agree at the bits that have already been examined. However, the two keys could differ at one of the unexamined bit positions. Accordingly, the key associated with the leaf is examined to determine if it matches the search value. If it does not match the search value, the first bit at which the two keys differ is determined. At this point, the search backs up to the point at which a bit of the search value differs from that of the leaf node offset value. Essentially, the information that is gathered during the comparison of values at the leaf node indicates the correct leaf to visit. Also note that CPU cache misses are not likely to be encountered when retracing the path followed by the blind search as shown above.

b) Updating

The methods required to implement the page level B-Tree operations directly on the encoding will now be described. A large portion of the effort involved in implementing the update operations is in maintaining the node list because maintaining the leaf list is relatively trivial.

(1) Insert

Inserting a leaf consists of finding the node j that will become the leaf's sibling. This node is the one found by the search algorithm given above: the insertion algorithm is much like the search algorithm except that one has to update the $L_j$ when proceeding down to account for the inserted leaf. Once a j is reached, the leaf's parent is simply inserted at j.

(2) Delete

Similarly, deleting a leaf consists of finding the leaf's parent and removing it from node array. As with insertion, the $L_j$ must be adjusted on the second pass down the tree.

(3) Split

Performing a split is more involved than either insertion or deletion. In the currently preferred embodiment, a split is implemented as a shift of the tree formed by the first i leaves to an empty page on the left. If the page is not empty, a merge is simply performed afterwards on the existing and shifted trees. To perform split between the ith and i+1st leaves first requires locating their lowest common ancestor j. Two passes are then made over the tree. The first pass copies the nodes belonging to the left tree. The path to the ith leaf is traced. Whenever the path goes to the right the nodes in the left subtree are copied to consecutive locations in the new node array. (Note that the nodes of any subtree appear in l–1 consecutive locations, where l is the number of leaves in the subtree). The first pass stops when j is reached. At this point the nodes in j's left subtree are simply copied. The second pass fixes up the nodes left behind. Typically, most of nodes are already in correct position. The second pass only fixes up the nodes that are needed to keep on the path from the root to j. As the path to j is retraced, nodes are retained if the path goes left at the node.

When splitting a page in two, a value is selected that separates the resulting pages. This value is inserted into the parent. Ideally this value should be as short as possible. Note that, as discussed above, the bit offsets in the tree are just the lengths of values needed to discriminate between adjacent leaves. In the currently preferred implementation, the split operation is given a pair of indexes (i, j) with i<j. The split operation is allowed to split the page at any point in this range; the point chosen is the one that minimizes the resulting key length.

Note that the key associated with the rightmost pointer of a non-leaf page can be any value larger than the largest value on the page (in particular the value consisting of M ones which has a zero length representation). This value can be changed after the split of an internal page by deleting the old rightmost value and replacing it with the shorter one. The specific steps involved in a split operation in the currently preferred embodiment will now be described.

(4) Merge

A merge starts by copying the nodes for the left and right trees into consecutive locations, leaving room for a node in the middle. This leaves most of the right tree nodes in their proper position, with only the positions of the nodes along the left spine in question. The merge then walks the right spine of the left tree and the left spine of the right tree, shifting the nodes of the left tree as this tree is walked in order to properly position them. The only thing remaining to do after this is to update the remaining hole (i.e., gap in the tree), wherever it might be, to join the remaining subtrees from the left and right trees. The specific steps involved in a merge operation are described below.

4. Range Searches

The most common index operation is to search for a given value. If the index is not unique, then a range query must be done. One simple approach would be to find the first and one past the last index entries containing the value by supplying '–∞' and '+∞' for the rid, respectively, and then return the intervening entries as the normalization provides for strict upper and lower bounds for each column. However, this approach is too expensive, especially if only a few values are returned and the cost of the second probe is significant. The approach of the present invention is to tag the pointers in a leaf page with a bit which indicates that the next row contains a key which differs from the current key only in the rid. This bit avoids the retrieval of a non-matching row to stop the scan and saves one row access (and possible page read) for each such range scan. Furthermore, it is not expensive to maintain this bit during insert operations on the Patricia tree. For deadlock avoidance, each leaf page also stores the rid of the first row on the next leaf page. Since the leaf pages are doubly linked, this does not introduce extra update overhead, although it does require an additional eight bytes for each leaf page.

F. Exemplary Operations on Compact B-Tree Index

1. Internal Nodes, Leaf Nodes and Subtrees

The methodology of the present invention may be illustrated by example. The following discussion will describe several operations on an exemplary compact B-Tree index constructed in accordance with the present invention. For purposes of explanation, a tree structure is used to illustrate several operations on exemplary path-compressed binary tries (Patricia trees) which, in accordance with the present invention, are used within B-Tree pages. However, it should be emphasized that the actual operations are performed on the above-described array representations of these Patricia trees, enabling these operations to be handled more efficiently.

Figure 7A:
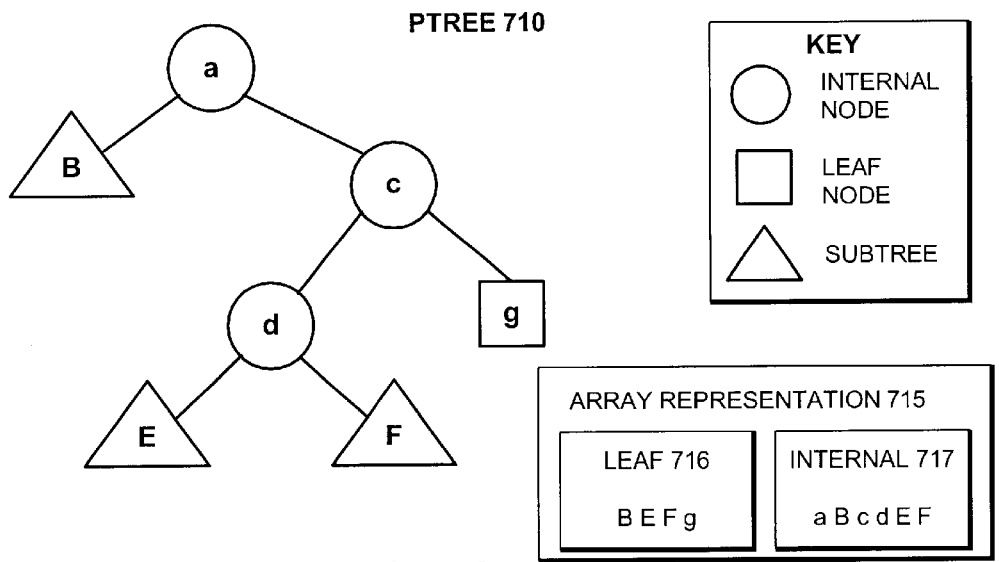
FIG. 7A illustrates an exemplary path-compressed binary trie (ptree).

FIG. 7A illustrates an exemplary Patricia tree (path-compressed binary trie) 710. As shown, individual nodes of the path-compressed binary trie (hereinafter "ptree") 710 are labeled with lower case letters (e.g., "a", "c""d", and "g"), while subtrees are indicated with uppercase letters (e.g., "B", "E", "F"). The ptree 710 shown at FIG. 7A includes internal nodes, leaf nodes, and subtrees. Each subtree contains one or more nodes. Also shown at FIG. 7A is a high-level array representation 715 of ptree 710. The operations described in the following discussion are actually performed on an array representation of the ptree constructed in accordance with the present invention. As shown at FIG. 7A, the array representation 715 includes a leaf array 716 and an internal array 717. The leaf array 716 includes nodes/subtrees B, E, F, and g. The internal array 717 includes nodes/subtrees a, B, c, d, E, and F.

2. Bit Offsets and Keys Associated with Nodes

Figure 7B:
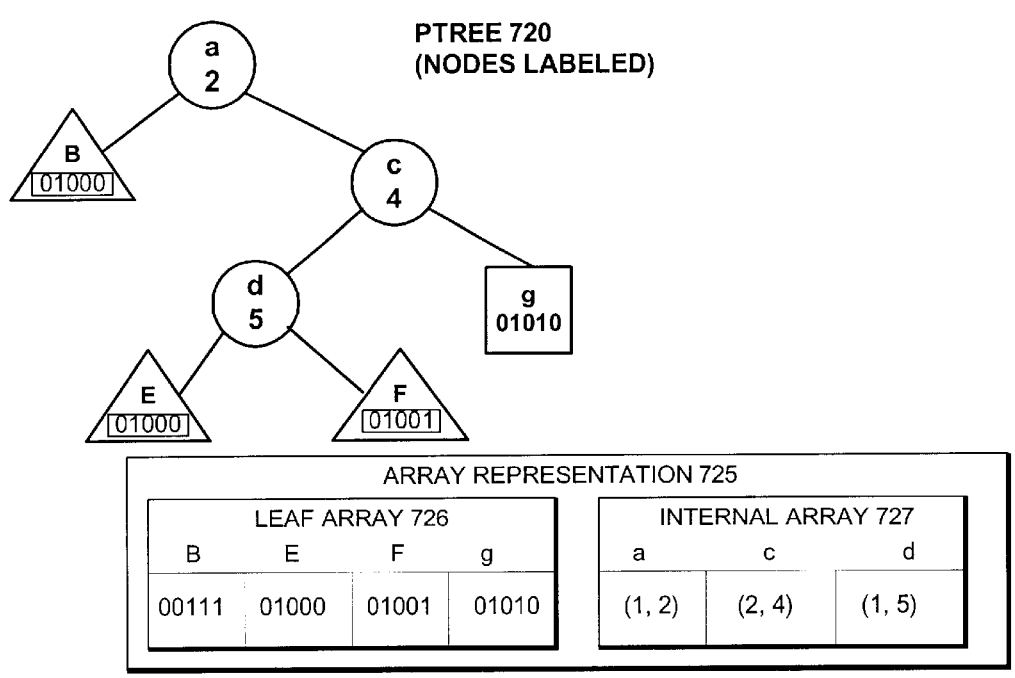
FIG. 7B illustrates the bit offsets and keys associated with internal nodes and leaf nodes of the ptree of FIG. 7A.

In accordance with the present invention, each internal node x of a ptree has an associated bit offset (bit(x)) and each leaf node y has an associated key (key(y)). FIG. 7B illustrates a ptree 720 including the bit offsets and keys associated with internal nodes and leaf nodes of the ptree 710 of FIG. 7A. As shown at FIG. 7B, each internal node of the ptree of FIG. 7A is labeled with the bit offset (bit(x)) and each leaf node with the key (key(y)). All keys beneath a node x have the same initial bit(x)−1 bits prefix(x). The keys in the left subtree have a subsequent '0' bit, while those in the right subtree have a subsequent '1' bit. For example, as shown at FIG. 7B the keys in subtrees E and F agree on the first four bits (prefix(d)='0100') but differ in the subsequent bit. The difference is that the next bit in the keys in subtree E is a '0' while the next bit in the keys in subtree F, which is to the right, is a '1'.

3. Array Representation of Ptree

FIG. 7B also includes a high-level array representation 725 of the exemplary ptree 720. As shown, the array representation 725 contains two arrays: a first array (leaf array) 726 for leaves, and a second array (internal array) 727 for internal nodes. Each of these arrays lists the nodes as encountered in pre-order traversal of the ptree 720. Note that for subtrees, the label of the subtree is used to represent the list of nodes in the array representation of the subtree (possibly empty in the case of a leaf). In the leaf array, the key (key(y)) is stored for each leaf y. In the internal array 727, each node x contains the number of leaves in the left subtree of node x and the bit offset associated with node x (i.e., (each node x stores (leaves (left(x)), bit(x)) where leaves (y) and left(y) represent the number of leaves beneath and the left subtree of node y, respectively). As shown at FIG. 7B, the leaf array 726 of the array representation 725 is simply the list of (pointers to) keys in ascending order.

4. Variables Maintained During Traversal of Ptree

In the following discussion and in FIGS. 7A–H, the tree representation is used to explain how several operations are performed in accordance with the methodology of the present invention. However, the operations described below actually occur on an array representation of the ptree rather than on a tree representation. When "walking" or traversing the tree, the present invention does not retain a pointer to the current node. Rather, the following state variables are maintained:

i=index of leftmost leaf of current subtree;

j=index of root of current subtree; and n=number of leaves in current subtree.

A tree (ptree) is walked (i.e., traversed) by starting from the root (i=1, j=1, n=number of leaves in tree) and typically stopping when n=1 (i.e., when a leaf node is reached).

To traverse the ptree to the left the following settings are made:

i'=i—index of leftmost leaf does not change;

j'=j+1—root of left subtree immediately follows parent; and n'=leaves (left(j))—fetched from internal array.

To traverse the ptree to the right, the following settings are made:

i'=i+L—where L is equal to the number of leaves in the left subtree (L=leaves (left(j));

j'=j+L—number of internal nodes in subtree is number of leaves minus one; and n'=n−L—L is equal to leaves in left subtree as described above.

5. Basic Operations

Basic operations which are used in implementing other more complex operations include blind search (blindsearch (v)−>i) and trace path (tracepath to leaf (i)) as follows:

blindsearch(v)−>i—walk the tree from the root to a leaf going left or right at x depending upon whether v [bit(x)] equals '0' or '1', respectively. The returned value i is the index of the visited leaf.

tracepath to leaf(i)—walk the tree from the root to ith leaf. To do this, a state variable m is used to track the index of the searched for leaf in the current subtree. When going left, m'=m, when going right, m'=m−leaves (left (j)).

FIG. 7C illustrates a blind search operation on the ptree array representation 725 shown at FIG. 7B. The blind search for the key value '01001' commences at the root node with i=1, j=1, and n=4 (the number of leaves in ptree 720). As shown at 1, the second bit of '01001' is '1', so the search proceeds to the right. At this point i is increased to 2 (increased by L value of 1), j is also increased to 2, and n is decreased to 3. Note that as the search proceeds to the right, leaves in the left subtree are skipped. As shown at 2, the next bit examined is a '0', so the search proceeds to the left, with i remaining at the same value (2), j increased from 2 to 3, and n decreased to 2. The next bit examined at 3 is a '1' so the search proceeds to the right. At this point, the value of n is equal to 1 as the leaf has been reached and the key value ('01001') located.

6. Search

The following describes the process for a search operation (search(v)) which returns i such that key(i−1)<v<=key(i). In other words, the search operation finds the least i such that key(i)>=v). The steps involved in this search operation are as follows:

1. l<−blindsearch(v). Blind search for key value(v) to reach leaf node l.
2. Calculate the bit offset d as the first bit at which the search value(v) and the key of the leaf node (key(l)) differ. If they do not differ (i.e., if key of leaf node matches search value), return l as correct value has been located.
3. Trace path to the lth leaf, stopping if reaching an internal node j with a bit offset greater than the calculated offset d (i.e., stopping if bit(j)>d) or stopping if l is reached.
4. Return i if v[d]=0, or i+n if v[d]=1 (where i and n are the state variables from tracing the path to l (i.e., i is the leftmost leaf of n leaves under j). For example, suppose in the tree shown in FIG. 7A bit(d) is greater than bit(c)+1. Then searches for v=prefix(c) 0 and w=prefix(c) 1 will both stop before node d. However, search(v) will return the number of leaves in subtree B as shown at FIG. 7A, while search (w) will return the number of leaves in subtree B, plus those in subtrees E and F (i.e., the number of leaves under internal node d as shown at FIG. 7A).

7. Insert

Figure 7D:
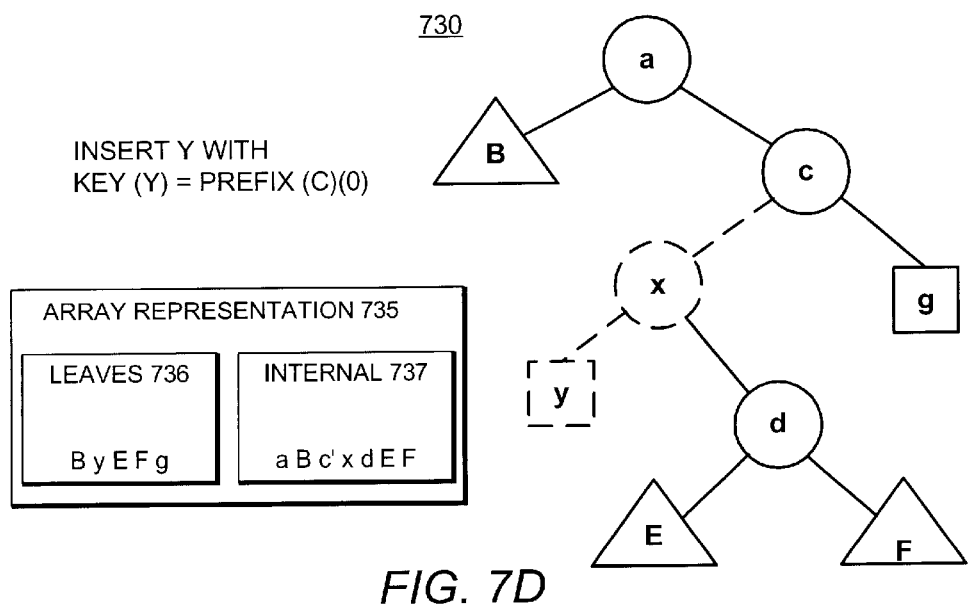
FIGS. 7D–E illustrate two different insert operations performed on a ptree.
Figure 7E:
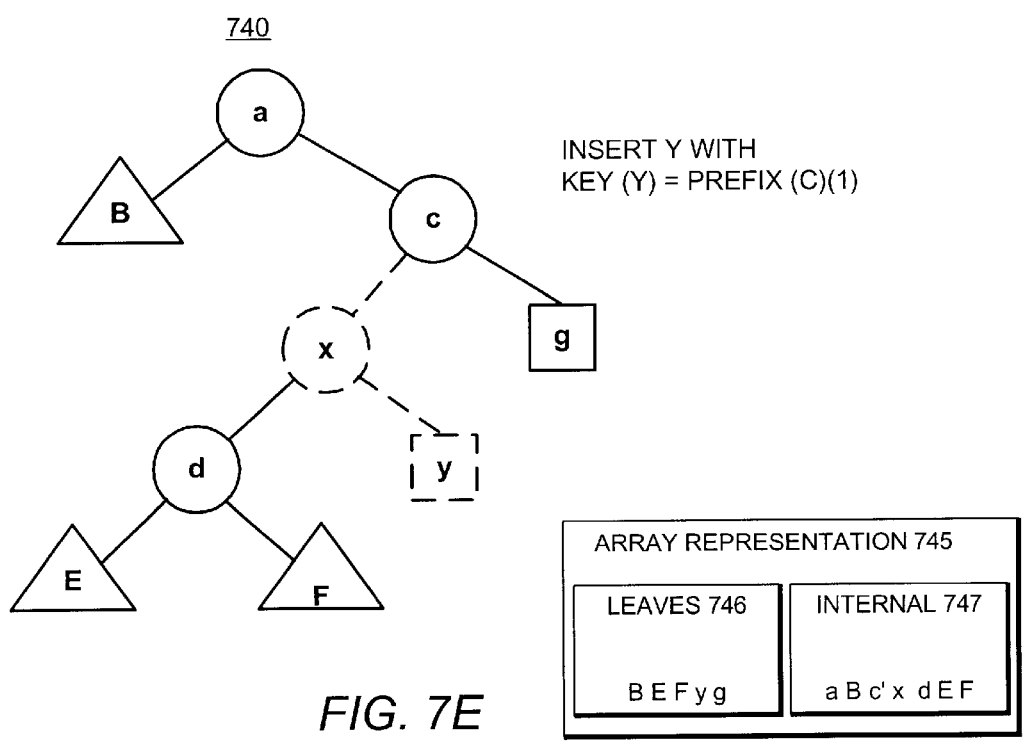

FIGS. 7D–E illustrate two slightly different insert operations performed on a ptree. The initial ptree before either of these two insert operations is performed is the same ptree 710 previously shown at FIG. 7A. As previously described, ptree 710 includes leaves B, E, F, and g as well as internal nodes a, B, c, d, E, and F. The process for inserting y with a key key(y) into the ptree 710 of FIG. 7A is as follows:

1. l<−blindsearch(y). Blind search for key value(y) to reach leaf node l.
2. Calculate the bit offset d of first bit at which the key(y) and the key of the leaf node (key(l)) differ. If they do not differ, raise an error condition, as key values must be unique.
3. Trace path to the lth leaf, stopping if visiting an internal node j with a bit offset greater than the calculated offset d (i.e., stopping if bit(j)>d) or stopping if arriving at l. While tracing the path, whenever traversing to the left, 1 is added to the value of leaves (left(j)), where j is the parent node, as a leaf will be inserted in the left subtree of j.
4. Insert y in the leaf array at i and, depending upon whether y[d] is '0' or '1', insert (i, d) or (n, d) in the internal array at j (where i and n are the state variables from tracing the path to l (i.e., i is the leftmost leaf of n under j).

FIGS. 7D–E illustrate the ptree after insertion of node y. As described above, after the initial blind search, a bit offset d is computed as first bit at which the search value(y) and the key of the leaf node (key(l)) found as a result of the blind search differ. For purposes of this example, the bit offset in node d is greater than the bit offset in node c plus one (i.e., bit(d)>bit(c)+1). FIG. 7D illustrates a ptree 730 after insertion of a node y having a key value key(y)=prefix(c) 0 into the ptree 710 of FIG. 7A. The inserted nodes are indicated by dashed lines in ptree 730 at FIG. 7D. FIG. 7E represents a ptree 740 after insertion of a node y having a different key value into the same ptree 710 of FIG. 7A. FIG. 7E shows the different ptree resulting from the insertion of a node having a key value of key(y)=prefix(c) 1.

As shown at FIG. 7D, if key(y)=prefix(c) 0, a new internal node x is inserted below and to the left of node c. As also shown, the leaf array 735 includes nodes/subtrees B, y, E, F, and g, while the internal array includes nodes/subtrees a, B, c', x, d, E, and F. In this situation, c'=(leaves (left(c)+1, bit(c)) and x=(1, bit(c)+1).

Alternatively, if key(y)=prefix(c) 1, a new internal node x is inserted beneath node c, node y is inserted below and to the right of this internal node x and internal node d and subtrees E and F are to the left of node y, all as illustrated at FIG. 7E. The nodes/subtrees stored in the leaf array include B, E, F, y, and g. The internal array includes nodes/subtrees a, B, c', x, d, E, F, where c'=(leaves (left(c))+1, bit(c)) and x=(number of leaves in subtrees E and F, bit(c)+1).

8. Delete

The following describes a delete operation for deletion of node(v) of a ptree. The process involved in deletion of an exemplary node v is as follows:

1. l<−blindsearch(v). Blind search for key value(v) to reach leaf node l.
2. If the search value(v) and the key of the leaf node (key(l)) differ, raise an error condition, as v is not a key in this situation.
3. Trace path to the ith leaf, subtracting one from leaves (left(j)), where j is the parent node, when traversing left in the tree, as a leaf will be removed from node j's left subtree.
4. Delete the ith entry from the leaf array and the j th entry from the internal array, where j is the parent of l (i.e., the last internal node visited before arriving at leaf l).

9. Split

Figure 7F:
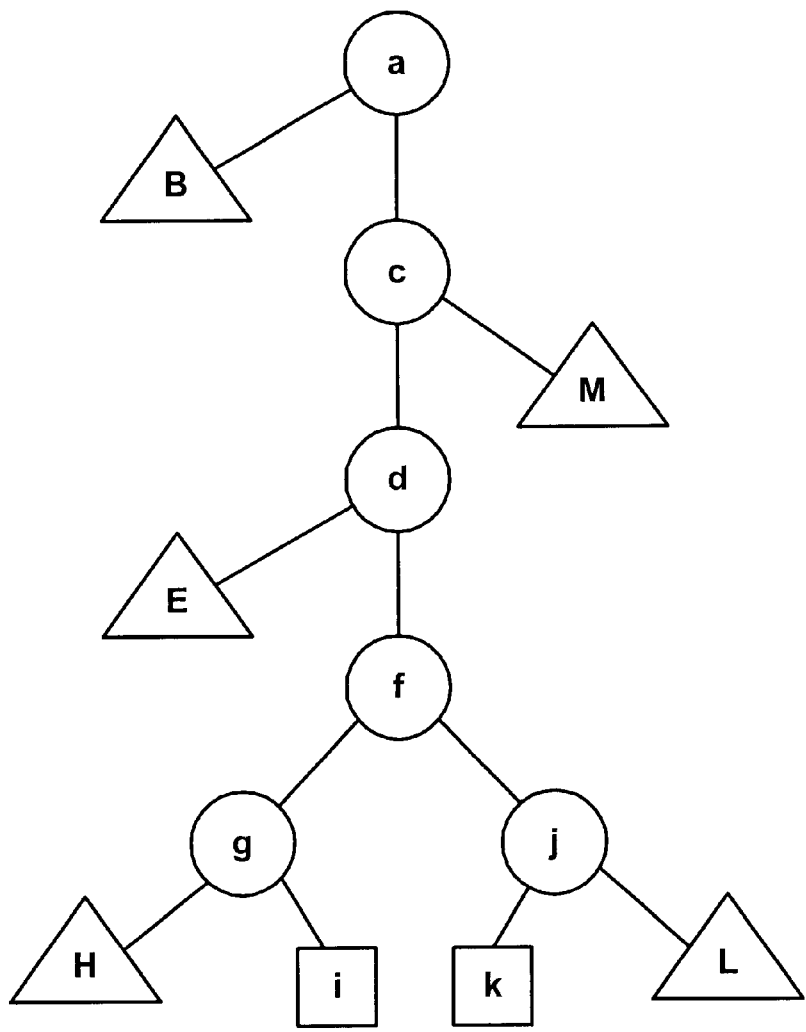
FIGS. 7F–G illustrate a split operation on a ptree.
Figure 7G:
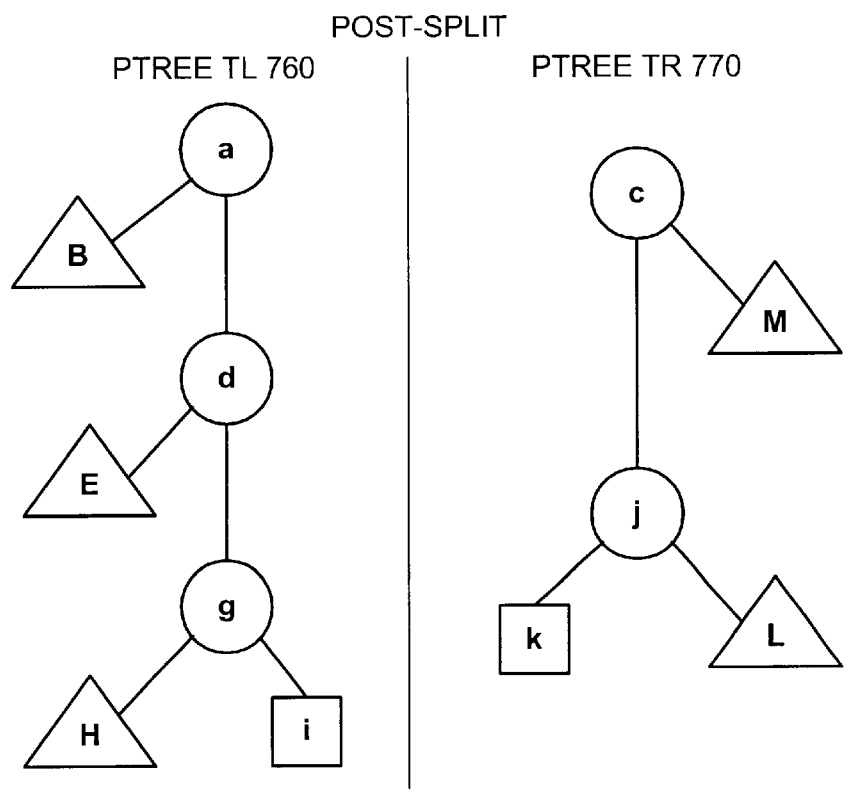
Figure 7G:
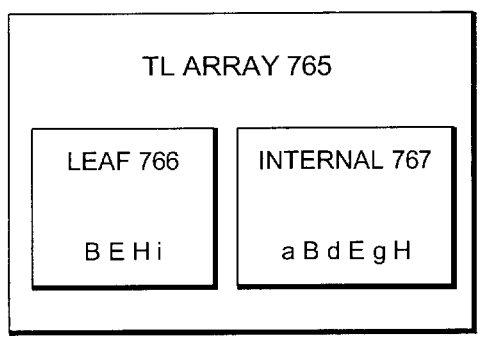
Figure 7G:
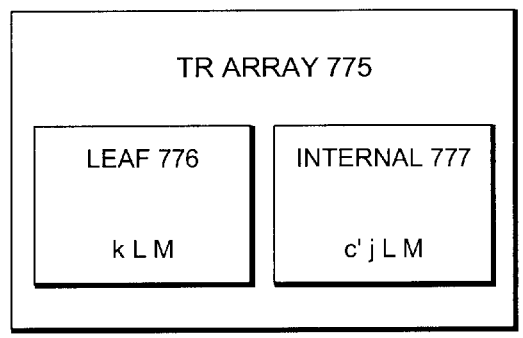

FIGS. 7F–G illustrate a split operation on a ptree 750 having an array representation 755 including leaf array 756 and internal array 757. As shown, the split operation splits ptree 750, shown at FIG. 7F, into ptree TL 760 and ptree TR 770 shown at FIG. 7G. After the split, the left Patricia tree (TL) 760 contains the first l leaves (i.e., B, E, H, and i) as shown at leaf array 766 at FIG. 7G. The right Patricia (TR) 770 contains the rest of leaves (k, L, M) as shown at leaf array 776. The process of splitting ptree 750 is as follows:

1. The process commences with copying the first l nodes in the leaf array 756 (i.e., nodes/subtrees B, E, H, i as shown at FIG. 7G) to TL 760 (i.e., leaf array 766) and copying the remaining nodes/subtrees in the leaf array (i.e., k, L, M) to TR 770 (i.e., leaf array 776).
2. Traverse ptree 750 to the lth leaf. As the tree is traversed, whenever proceeding to the right, the nodes in the left structure (the leaves (left(j))−1 nodes following the parent j) are appended to those already in TL 760.
3. Walk ptree 750 again to the lth leaf. During this traversal, whenever proceeding left, an entry (leaves (left(j))−m, bit(j)) is appended to TR 770, where j is the (index of the) parent node, and m is the state variable keeping track of the offset to the lth leaf in the current subtree. The state variable m indicates the number of leaves that will be lost to TL 760).
4. Next, the last N internal nodes in ptree 750 are appended to TR 770 where N is the number of internal nodes that should be in TR 770 (i.e., the number of leaves in TR−1) minus the number of nodes currently in TR 770 as a result of step 3 above.

As shown at FIG. 7G, after the split the leaf array 766 for TL 760 includes nodes/subtrees B, E, H, and i, while the internal array 767 includes nodes/subtrees a, B, d, E, g, and H. The array representation 775 for TR includes leaves k, L, M in leaf array 776 and internal nodes/subtrees c', j, L, M in internal array 777.

It should be noted that the bulk of the work in splitting the array representation 755 containing ptree 750 is in determining which elements of ptree 750 should be copied to TL 760 (i.e., array representation 765) and which should be copied to TR 770 (i.e., array representation 775). Typically, only a few entries in the internal arrays actually need to be modified as a result of the split operation. The process of merging two ptrees will now be described.

10. Merge

Figure 7H:
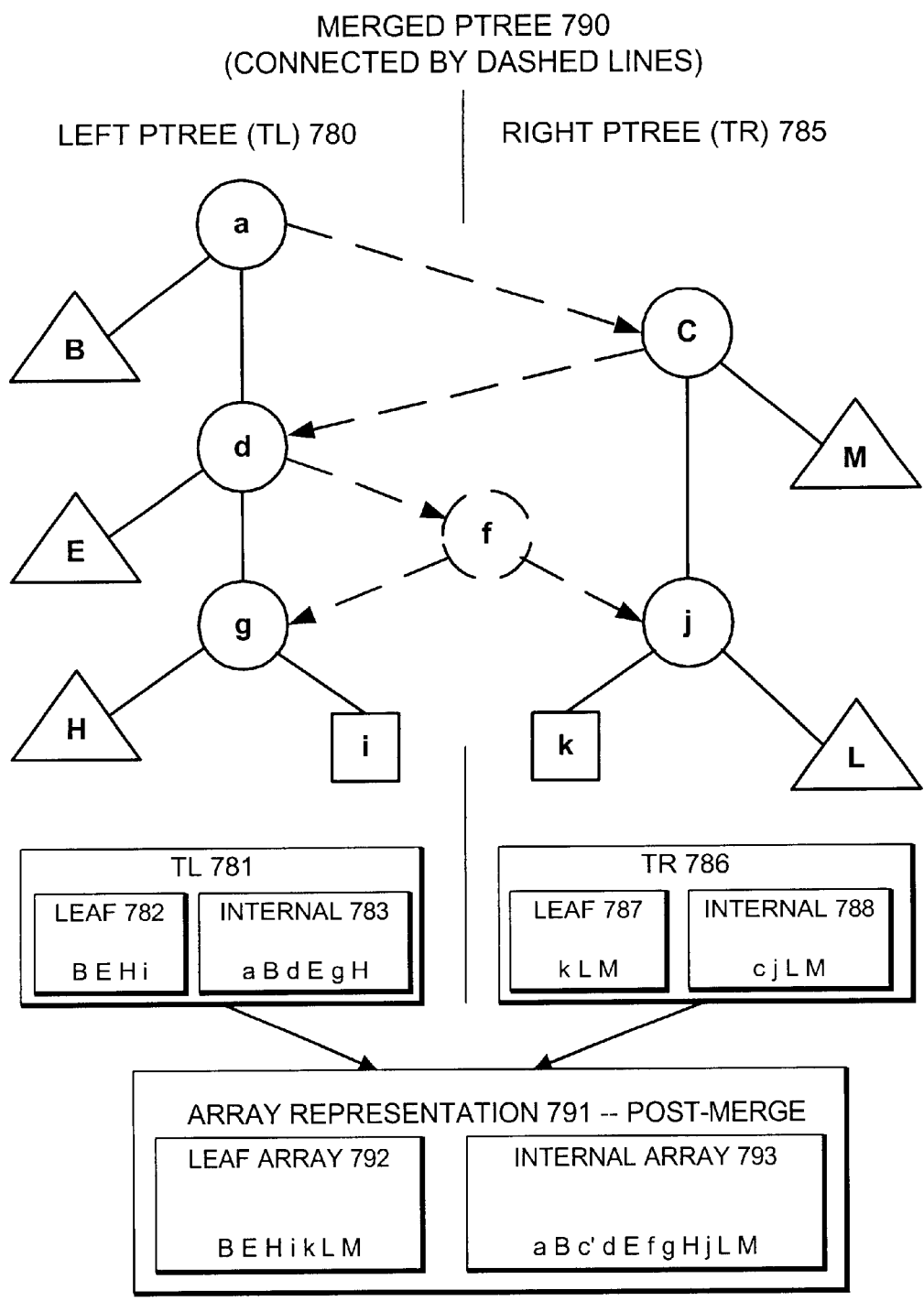
FIG. 7H depicts a merge operation involving two ptrees.

FIG. 7H illustrates a merge operation involving two ptrees TL 780 and TR 785 into a single ptree 790 (shown as the combination of TL 780 and 785 including the connecting dashed lines and an additional node f). As shown, the merge operation is the inverse of the split operation described above. The process for merging two ptrees TL 780 and TR 785 into a single ptree 790 is as follows:

1. Initially, the merge operation commences by appending the leaves of TL 780 and TR 785 to the new ptree 790 that is being formed (represented by the dashed lines as shown at FIG. 7H).
2. The offset d is computed as the first bit at which the rightmost leaf of TL 780 and the leftmost leaf of TR 785 differ.
3. TL 780 is traversed to its rightmost leaf($\|TL\|$) and TR 785 to its leftmost leaf(1) concurrently (where $\|TL\|$ represents the number of leaves in TL 780). Each step of the combined traversal is either a step to the right in TL or a step to the left in TR depending on the values of the bit offsets in the root of the current subtrees of TL and TR. An additional state variable n is maintained which tracks the number of leaves in the yet to be merged subtrees of TL and TR. Initially n is set to equal the number of leaves in TL and TR (i.e., n=$\|TL\|+\|TR\|$). The traversal proceeds as follows:
    (a) If bit($j_l$)<bit($j_r$), proceed to step 4 below if bit($j_l$) >offset d. Otherwise append node $j_l$ (from TL) and the internal nodes of its left subtree to the merged tree, set n'←n−(leaves (left($j_l$)), and take a step right in TL.
    (b) Otherwise one must have bit($j_r$)<bit($j_l$). If bit($j_r$) >offset d, proceed to step 4 below. Otherwise append node(n−($n_r$−leaves (left($j_r$)), bit($j_r$)) to the merged tree [note that this is just a modified copy of the node $j_r$ from TR and the internal nodes of its right subtree will be copied in step 4.], set n'←n−($n_r$−leaves (left($j_r$))), and take a step left in TR.
4. Append a node ($n_l$, d) to the merged tree and then copy the remaining internal nodes in TL 780 and TR 785 to ptree 790 (in that order). The result of the foregoing operations is the merged ptree 790 indicated by the connecting dashed lines shown at FIG. 7H. The leaf array 792 of the post-merge array representation 791 includes all leaves from both leaf array 782 and leaf array 787. As also shown at FIG. 7H, the internal array 793 (post-merge) also includes all nodes from internal array 783 and internal array 788. In addition, internal array 793 contains an additional internal node f added as a result of the merge operation. Node c has also been modified as a result of the merge operation as represented by node c' of the post-merge internal array 793.

The foregoing examples illustrate how the array representation of the present invention may be directly manipulated to perform various standard operations, including search, insert, delete, split and merge operations. The methodology of the present invention enables these operations to be efficiently performed directly on array representations of path-compressed binary tries (ptrees). The creation of a compact B-Tree index will next be described.

G. Creation of a Compact B-Tree Index

Figure 8A:
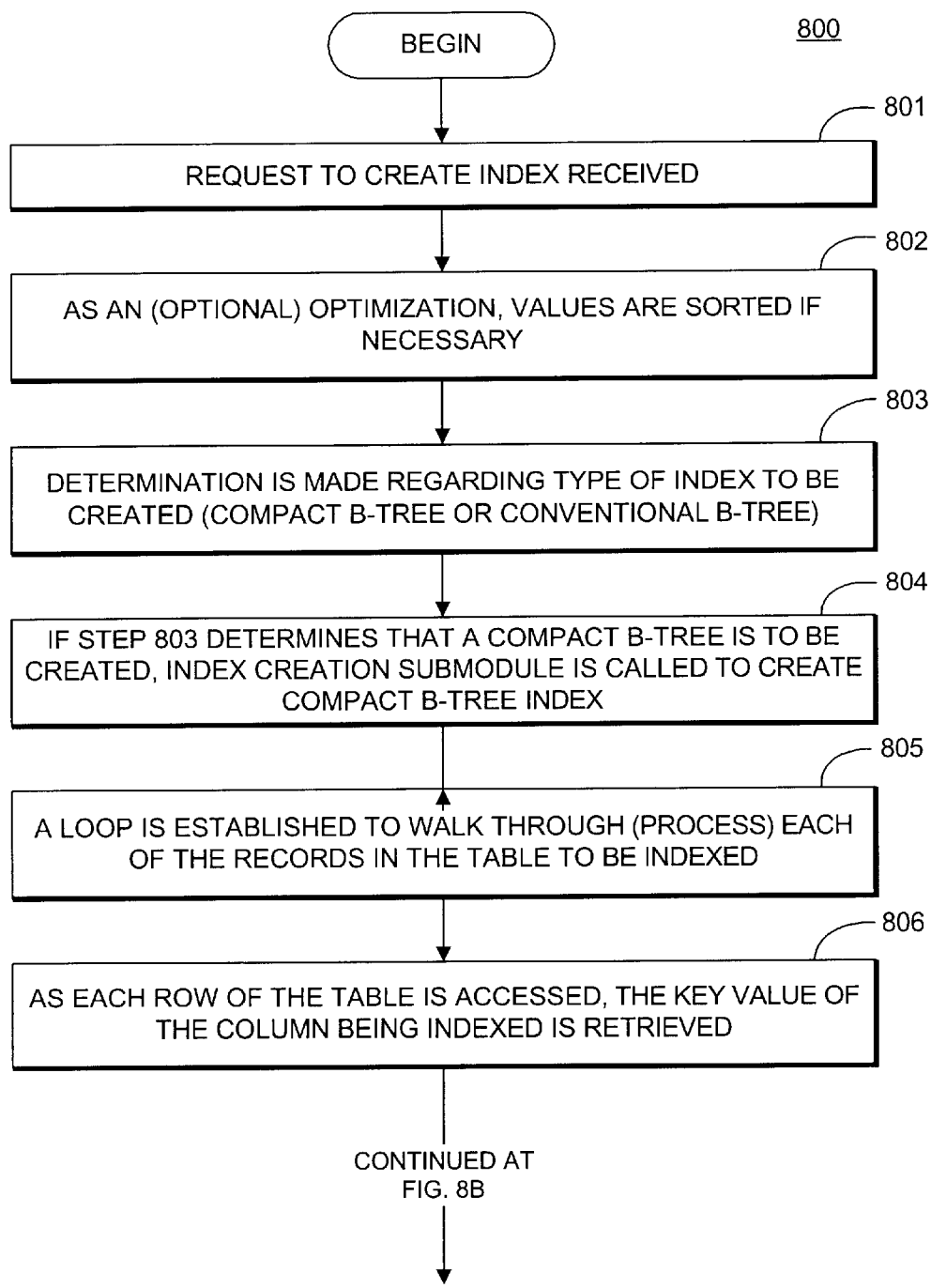
FIGS. 8A–B comprise a single flow chart illustrating the methods of operation of the present invention in creating a compact B-Tree index.
Figure 8B:
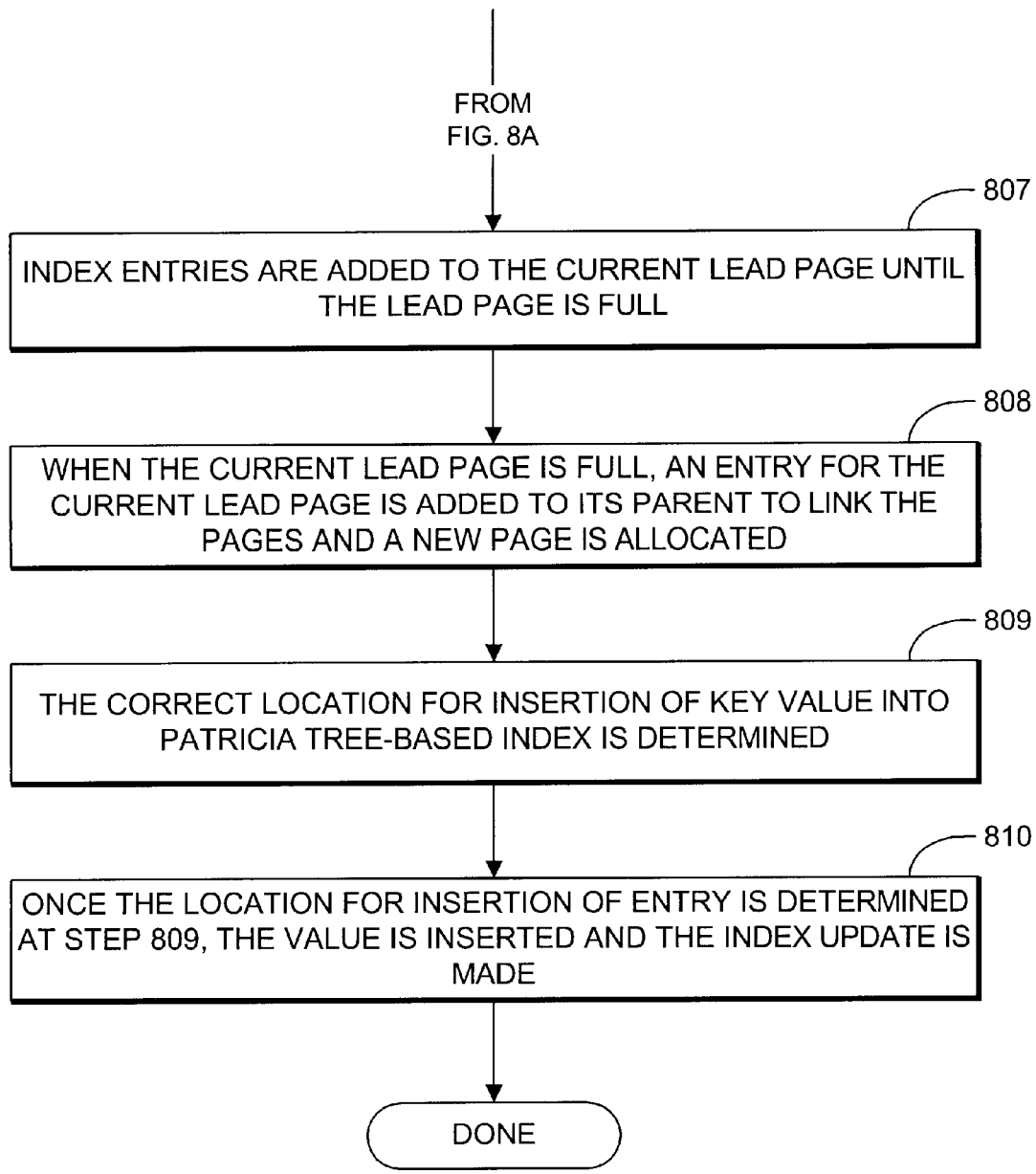

FIGS. 8A–B comprise a single flow chart 800 illustrating the methods of operation of the present invention in creating a compact B-Tree index. The following discussion uses this example of the creation of an index from a database table to further illustrate the operations of the present invention. However, there are several other operations, such as searching an index, reorganizing an index for a particular value, inserting a value into an index, and deleting an index that are also relevant in explaining the operations and advantages of the compact B-Tree index structure of the present invention. These operations are described above in this document. The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

The method begins at step 801 with the receipt of a request to create an index. For example, a user may request the creation of an index on a particular column of an existing database table. As an optimization, at (optional) step 802, the values in the column are sorted if necessary. If the values in the column are not in sorted order, these values are sorted, as it is generally more efficient to build an index from a sorted list of entries. Sorting the list of entries serves to minimize the number of pages that are required in the working set.

In the currently preferred embodiment, the same application-programming interface provides access to both conventional (comparison-based) B-Tree indexes as well as to the trie-based compact B-Tree indexes of the present invention. When an index is to be created, at step 803, a determination is made as to which type of index should be created. If the width of the columns being indexed (i.e., key length) falls within a pre-determined range, then compact B-Tree indexes are used as these compact B-Tree indexes typically provide better performance than comparison-based (conventional) B-Tree indexes in these circumstances. Otherwise, conventional B-Tree indexes are generally used in circumstances where the indexes have either very short keys or very long keys. For purposes of the following discussion, it is assumed that the index to be created is a compact B-Tree index which is to be created in accordance with the methodology of the present invention.

At step 804, the index creation submodule of the system of the present invention is called to create a compact B-Tree index (e.g., to create an index on a particular column of a database table). The index creation submodule receives a handle to the index to which the values are to be appended. Each of the individual values that are to be inserted into the index during index creation is appended to the end of the index. At this point the meta data necessary for creating the index is also generated. At step 805, a loop is established to walk through (i.e., process) each of the records in the table. At step 806, as each row of the table is accessed, the key value of the column being indexed is retrieved. In the currently preferred embodiment, these key values are in sorted order as a result of the prior sorting operation at (optional) step 802 above. Alternatively, if the key values are not already in sorted order, they would be sorted before they are appended to the index as described below.

At step 807, the index entries that have been retrieved are added to the current lead page until the lead page is full. When the current lead page is full, at step 808 an entry for the current lead page is added to its parent (to link the pages) and a new page is allocated. For each level in the index, a page is typically always in process of being built. Essentially, the right-most page at each level of the index is a page that is in process of being built. The process for index creation involves filling up the bottom pages and then linking in the page by adding an entry to its parent and so on and so forth. When a page is filled a new page is allocated and the process continues.

With a conventional (comparison based) B-Tree index, the key values are simply appended to the end of an array. However with the present Patricia tree-based index (i.e., compact B-Tree), at step 809 the correct location for insertion of the key value must be determined before the element is inserted and the update is made. Appending a key value is a simpler case than an inserting a value(as described above) as when appending a key value one knows to always follow the right most spine of the index (i.e., the search is always going right). In addition, the value of the right-most leaf node of each page (i.e., the current largest value on each page at each level) is tracked to optimize the insertion of values into the index. When a value is to be inserted, the value is compared to this tracked value to determine the first bit at which the values differ. The values will differ because if the values would not differ, the method of the present invention provides for appending the row ID to ensure that values can be distinguished. If the value is greater than the previous entry, there will be a '1' bit on (rather than a '0') in the value that is to be entered. As a result, the location for insertion of the entry can thus be determined by examining a bit beyond the first bit at which the values differ. Once the location for insertion of an entry is determined, at step 810 the value is inserted into the Patricia tree-based index and the update is made. The key value that is inserted is inserted as a new right sub-tree and the values that are below the position reached in the tree will be the left sub-tree below this position.

It should be noted that the above discussion refers to insertion of an element in a tree structure. However, the method of the present invention provides for the use of an array-based representation of the Patricia tree-based index as previously shown at FIG. 6 and at FIGS. 7A–H. Instead of storing some sort of tree structure with links, two arrays are used as described above. The first array (or leaf array) is an array of leaves which are stored in order. The second array (or internal array) is an array of internal nodes. As previously described, each internal node consists of a bit offset and the number of leaves in the left sub-tree. The tree is traversed in a set order and mapped to these arrays with the result that the position in the array is related to the traversal order. In addition, the array contains sufficient information which enables a tree representation to be reconstructed from the array representation.

H. Summary and Related Work

Like the compact B-Tree of the present invention, the Bit-Tree of Ferguson may be used for OLTP workloads. Both manipulate compact Patricia tree representations directly. However, the compact B-Tree implementation differs from the Bit-Tree of Ferguson in that the same representation is used for the internal pages, with keys being stored in the associated child page, while the Bit-Tree reverts to a conventional representation for internal pages. Bit-Tree leaf pages are more compact; the compact B-Tree of the present invention requires an additional 2 bytes per entry for internal nodes (the size of the left subtree of the node) as well as room for a key. However, these additional bytes enable a compact B-Tree page to be searched in logarithmic time whereas the Bit-Tree leaf pages can only be searched in linear time.

The pkBit-Tree of Bohannon is an optimization of the Bit-Tree for main memory databases (see e.g., Bohannon, et. al "Main-Memory index structures with Fixed-Size partial keys," above). The pkB-Tree generalizes and improves upon Bit-Tree by storing a small amount of key information to avoid full compares. While searching is still linear, extra information added to the node (typically 2 to 4 bytes) allows many full compares to be avoided. A potential disk cache miss is hidden by fact that the referenced page is either likely already in cache or it will likely be fetched in the near future. As with the present invention, the pkB-Tree internal and leaf pages share a common representation. However, the pkB-Tree is a B-Tree, not a B+-Tree. As a result, keys in internal pages reference the rows in the underlying table. This requires an extra rid per internal page entry.

The simplified String B-Tree described in the literature also requires two entries per child. See e.g., Ferragina, P. and Grossi, R., "Fast string searching in secondary storage: Theoretical developments and experimental results," In Proceedings of the ACM-SIAM Symposium on Discrete Algorithms (SODA '96), pages 373–382, Atlanta, June 1996, ACM Press. See also, Ferragina, P. and Grossi, R., "The string B-Tree: A new data structure for string search in external memory and its applications," Journal of the ACM, 46(2): 236–280, 1999. However, as with the pkB-Tree, the simplified String B-Tree is a B-Tree, not a B+-Tree, and uses the same representation for internal and leaf pages. A significant advantage of the simplified String B-Tree for long strings is that it avoids rescanning: bits in the searched key are looked at only once, not once per level. Unlike the previously mentioned implementations, the simplified String B-Tree does not manipulate the on disk representation directly; rather it decompresses and compresses it as required.

Patricia trees have been used previously as access paths for relational databases in memory constrained environments. See e.g., Karlsson, J., Lal, A., Leung, C., and Pham, T., "IBM DB2 Everyplace: A small footprint relational database system," In 17th International Conference on Data Engineering (ICDE' 01), pages 230–232, Washington-Brussels-Tokyo, April 2001, IEEE Computer Society Press. A disadvantage of using a Patricia tree directly is that the tree can be skewed quite badly depending on data distribution. In the B-Tree based implementations, in contrast, the effects of data skew are limited to a page. Further, none of the more compact Patricia tree representations of prior implementations are suitable for representing arbitrarily large Patricia trees in the presence of updates.

One Patricia tree representation that addresses some these issues is the Index Fabric, a stratified Patricia tree (see e.g., Cooper, B., Sample, N., Franklin, M., Hjaltason, G., and Shadmon, M., "A fast index for semistructured data," In Proceedings of the Twenty-seventh International Conference on Very Large Databases, Roma, Italy, 11–14 Sep., 2001, pages 341–350, Los Altos, Calif. 94022, USA, 2001, Morgan Kaufmann Publishers. Conceptually, this approach starts with a Patricia tree and carves out page size subtrees. These subtrees are then indexed by another Patricia tree. The process is repeated until one is left with a root Patricia tree that fits in single page. An advantage of this representation is that one is almost certain that the page de-referenced for a full compare will be the next page visited. Another advantage is that rescanning can be avoided. However, implementing range queries (not described (or required) by Cooper, et. al., above) will be considerably more complex. In general, it is not possible to order two leaf pages, since the keys on one page could be intermingled with the keys on the other page.

Under most circumstances the performance of the compact B-Tree indexes of the present invention are comparable to that of existing B-Tree indexes if no full comparisons are required. The advantage of these compact B-Tree indexes depends on the size of the normalized key: if the key requires a full 10 bytes, then the compact B-Tree indexes have a slight advantage. However, for short keys, existing B-Tree indexes have a slight advantage. In addition, when very little cache memory is available (for example, less than 0.5% of the sum of the index and table sizes) compact indexes are at the mercy of the buffer manager: if the upper levels of the index are not kept in memory the compact index performance can be degraded. The performance of the compact B-Tree indexes is relatively independent of key length: compared to existing indexes, it effectively eliminates the full compare overhead. This full compare overhead typically results in about a 25% performance penalty.

A key advantage of compact B-Tree indexes is their size. Compact B-Trees are roughly half the size of the existing B-Tree indexes. This space savings results from the significantly smaller per-leaf overhead of the compact B-Tree indexes. For compact B-Trees, the per-leaf overhead is 8 bytes for internal nodes and 9 bytes for leaf nodes, independent of the size of the normalized keys. For existing B-Tree index implementations, this overhead is usually between 12 and 41 bytes for internal nodes and between 8 and 37 bytes for leaf nodes, depending on the length of the normalized keys and the length of the normalized prefix stored in each page. Typical overheads are 19 for internal nodes and 15 for leaf nodes. While the per-leaf overhead is lower for compact B-Trees, they do require up to 200 bytes per page to store a single normalized key. For most indexes, this is more than offset by the savings due to lower per-leaf overhead.

The use of compact B-Trees in the database management system of the currently preferred embodiment is limited to cases where the normalized key is no more than 200 bytes and the index page size is at least 2,000 bytes. These restrictions ensure that no more than ten percent of each index page is needed for key storage. In practice, keys are typically much smaller than this 200 byte limit.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system comprising database tables and indexes on those tables, an improved method for creating an index based on a path-compressed binary trie, the method comprising:

for a given index to be created, determining a path-compressed binary trie for the given index, said path-compressed binary trie comprising internal nodes and leaf nodes;

based on a traversal of said path-compressed binary trie, creating an index comprising:
a first array of internal nodes encountered during the traversal, and
a second array of leaf nodes encountered during the traversal; and
wherein said system employs said first and second arrays for providing index-based access for a given key value.

2. The method of claim 1, wherein each particular internal node includes a bit offset indicating a particular bit value of the given key value to be examined at the particular internal node during traversal of the index.

3. The method of claim 2, wherein said bit offset represents a relative bit position.

4. The method of claim 2, wherein said bit offset represents an absolute bit position.

5. The method of claim 1, wherein traversal of said path-compressed binary trie includes pre-order traversal of said path-compressed binary trie.

6. The method of claim 1, wherein traversal of said path-compressed binary trie includes post-order traversal of said path-compressed binary trie.

7. The method of claim 1, wherein said determined path-compressed binary trie comprises a tree-based data structure, wherein each particular internal node points to at least two subtrees, and wherein each particular internal node stores information indicating a size for at least one of its subtrees.

8. The method of claim 7, wherein each particular internal node also stores information indicating which particular subtree is having its size tracked by the node.

9. The method of claim 8, wherein the particular subtree is identified as being a selected one of a left subtree and a right subtree.

10. The method of claim 7, further comprising:
receiving a request to search the index based on a particular key value;
while traversing the first array, using said information about subtree size to skip internal nodes in the first array that can be excluded, based on key value, from the search of the index.

11. The method of claim 1, further comprising:
receiving a request to search the index based on a given key value;
traversing internal nodes in the first array to locate a particular leaf which may contain said given key value;
comparing said given key value to a key value at the particular leaf.

12. The method of claim 11, further comprising:
if said given key value does not match the key value at the particular leaf, locating the position of a leaf containing a value matching said given key value based, at least in part, on the first bit at which said given key value and the key value at the particular leaf differ.

13. The method of claim 1, further comprising:
receiving a request to insert a given key value into the index;
traversing internal nodes in the first array to locate a particular leaf in the second array for insertion of said given key value;
comparing said given key value to a key value at the particular leaf; and
determining a position for insertion said given key value based, at least in part, on the first bit at which said given key value and the key value at the particular leaf differ; and inserting said given key value at the determined position and adjusting nodes in the first array and second array based upon insertion of said given key value.

14. The method of claim 1, further comprising:

receiving a request to delete a particular key value;

traversing internal nodes in the first array to locate said particular key value in the second array; and adjusting nodes in the first array and second array based upon deletion of said particular key value.

15. The method of claim 1, wherein said determined path-compressed binary trie comprises a tree-based structure in which each leaf node contains key values and each internal node includes a bit offset and has two child subtrees.

16. The method of claim 15, wherein said bit offset at a given internal node indicates a bit value of a particular key value to be examined to determine a direction to take at the internal node in traversing the path-compressed binary tree to locate said particular key value.

17. The method of claim 1, wherein correspondence between internal nodes in the first array and corresponding leaf nodes in the second array may be determined based on each node's respective array position.

18. The method of claim 1, wherein said first array includes bit offsets in the order encountered in a pre-order traversal of said path-compressed binary trie.

19. The method of claim 1, wherein said first array includes bit offsets in the order encountered in a post-order traversal of said path-compressed binary trie.

20. The method of claim 1, wherein said determined path-compressed binary trie comprises a tree-based data structure, wherein each particular internal node stores information indicating a size for at least one of its subtrees and a bit offset indicating a bit value to be examined to determine a direction to take in traversing the tree-based data structure to locate a given key value.

21. The method of claim 1, wherein a selected one of a search operation, an insert operation, a delete operation, a split operation, and a merge operation may be performed directly on said first array and said second array.

22. The method of claim 1, wherein said second array includes a pointer to a key value for each leaf node.

23. The method of claim 1, wherein said first array comprises an encoding of said determined path-compressed binary trie structure.

24. The method of claim 1, wherein said second array comprises an ordered array of leaf nodes of said path-compressed binary trie.

25. The method of claim 1, further comprising:

for each leaf node, storing in said second array an indicator as to whether the next key value is equal to the key value of the current leaf node.

26. A computer-readable medium having processor-executable instructions for performing the method of claim 1.

27. A downloadable set of processor-executable instructions for performing the method of claim 1.

28. In a database system, said database system storing a plurality of data records, an improved method for creating a path-compressed binary trie index of such records, the method comprising:

adding key values from at least some of the data records to at least one index page;

for each index page, determining a path-compressed binary trie of key values in said index page, said path compressed binary trie including leaf nodes and non-leaf nodes;

traversing said path-compressed binary trie and creating a path-compressed binary trie index by performing the substeps of:

for each non-leaf node of said path-compressed binary trie, storing in a first array a bit offset and information about size of at least one subtree of said each non-leaf node, said bit offset indicating a particular bit value of the given key value to be examined at the non-leaf node during traversal of the index; and for each leaf node of said path-compressed binary trie, storing in a second array a pointer to a key value.

29. The method of claim 28, wherein said index pages comprise B-tree index pages.

30. The method of claim 28, wherein said index pages comprise B+-tree index pages.

31. The method of claim 28, further comprising:

for each leaf node, storing in said second array an indicator as to whether the next key value is equal to the key value of the current leaf node.

32. The method of claim 28, further comprising:

for each index page, storing a header block in addition to said first array and said second array.

33. The method of claim 28, wherein said key values are stored on child pages for non-leaf index pages.

34. The method of claim 28, wherein said key values are obtained from the data records for leaf index pages.

35. The method of claim 28, further comprising:

for each index page, storing a value based on a count of a selected one of leaf nodes, internal nodes, and all nodes on the index page.

36. The method of claim 28, further comprising:

for at least some index pages, storing a key value for the index page, said key value associated with a pointer to the index page in the parent of the index page.

37. The method of claim 28, further comprising:

sorting said key values before creating said path-compressed binary trie index.

38. The method of claim 28, further comprising:

determining whether to create a selected one of a B-Tree index and a path-compressed binary trie index for a particular set of data records.

39. The method of claim 38, wherein said determining step includes evaluating the width of the column being indexed.

40. The method of claim 38, wherein said determining step includes evaluating the length of the key values.

41. The method of claim 28, wherein said bit offset represents a relative bit position.

42. The method of claim 28, wherein said bit offset represents an absolute bit position.

43. The method of claim 28, wherein said determined path-compressed binary trie comprises a tree-based data structure, wherein each particular non-leaf node points to at least two subtrees.

44. The method of claim 28, wherein each particular internal node also stores information indicating which particular subtree is having its size tracked by the node.

45. The method of claim 44, wherein the particular subtree is identified as being a selected one of a left subtree and a right subtree.

46. The method of claim 28, further comprising:

receiving a request to search the index based on a particular key value while searching pages during index traversal, while traversing the first array, using said information about subtree size to skip non-leaf nodes in the first array that can be excluded, based on key value, from the search of the index.

47. The method of claim 28, wherein correspondence between non-leaf nodes in the first array and corresponding leaf nodes in the second array may be determined based on each node's respective array position.

48. The method of claim 28, wherein said step of storing said pointer in a second array includes storing a key value on child pages for non-leaf index pages.

49. The method of claim 28, further comprising:

normalizing said key values to binary strings in an order preserving fashion.

50. The method of claim 28, wherein said pointers to key values comprise data record identifiers for leaf index pages.

51. The method of claim 28, wherein a selected one of a search operation, an insert operation, a delete operation, a split operation, and a merge operation may be performed directly on said index pages without reconstructing said path-compressed binary trie.

52. The method of claim 28, further comprising:

for each leaf node, storing an indicator in said first array as to whether the key value associated with the next leaf node is equal to the key value of the current leaf node.

53. The method of claim 28, wherein said step of adding key values includes linking a particular index page to its parent page and allocating a new index page when said particular index page is full.

54. The method of claim 53, wherein said step of linking said particular index page includes adding an entry for said particular index page in its parent page.

55. The method of claim 28, further comprising:

appending a row identifier to said key values in the event key values are not unique.

56. The method of claim 28, wherein said step of traversing said path-compressed binary trie includes a pre-order traversal.

57. The method of claim 28, wherein said step of traversing said path-compressed binary trie includes a post-order traversal.

58. A computer-readable medium having computer-executable instructions for performing the method of claim 28.

59. A downloadable set of computer-executable instructions for performing the method of claim 28.

* * * * *